(12) United States Patent
Akanuma

(10) Patent No.: US 9,575,312 B2
(45) Date of Patent: Feb. 21, 2017

(54) LIGHT DEFLECTOR, AND DEVICES INCORPORATING THE SAME

(71) Applicant: Goichi Akanuma, Kanagawa (JP)

(72) Inventor: Goichi Akanuma, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/929,926

(22) Filed: Nov. 2, 2015

(65) Prior Publication Data

US 2016/0139404 A1 May 19, 2016

(30) Foreign Application Priority Data

Nov. 17, 2014 (JP) ................. 2014-232757

(51) Int. Cl.
*G02B 26/08* (2006.01)
*G02B 26/10* (2006.01)
(Continued)

(52) U.S. Cl.
CPC ......... *G02B 26/0825* (2013.01); *G01S 7/4811* (2013.01); *G01S 17/936* (2013.01); *G02B 26/0858* (2013.01); *G02B 26/101* (2013.01); *G02B 26/105* (2013.01); *G02B 27/0149* (2013.01); *G03B 21/28* (2013.01); *G03G 15/0409* (2013.01); *G02B 2027/0154* (2013.01)

(58) Field of Classification Search
CPC .................. G02B 26/0841; G02B 2027/0154; G02B 26/0825; G02B 26/0858; G02B 26/101; G02B 26/105; G02B 27/0149; B41J 2/471; G03G 15/0409; H04N 1/1135; G01S 17/936; G01S 7/4811; G03B 21/28

USPC ............. 359/198.1–199.4, 200.6–200.8, 221.2,359/224.1–224.2
See application file for complete search history.

(56) References Cited

U.S. PATENT DOCUMENTS

2003/0053156 A1 3/2003 Satoh et al.
2005/0243396 A1 11/2005 Fujii et al.
(Continued)

FOREIGN PATENT DOCUMENTS

DE  10 2012 208 117 A1  11/2013
JP  2003-172897  6/2003
(Continued)

OTHER PUBLICATIONS

Extended European Search Report issued Mar. 3, 2016 in Patent Application No. 15192251.5.
(Continued)

*Primary Examiner* — James Phan
(74) *Attorney, Agent, or Firm* — Oblon, McClelland, Maier & Neustadt, L.L.P.

(57) ABSTRACT

A light deflector includes a mirror unit having a light reflection plane, a base, a pair of elastic supporting members each having one end attached to the mirror unit and the other end attached to the base and configured to support the mirror unit in a rotatable and oscillatable manner, and a pair of drive bars each having one end attached to another end of a corresponding one of the elastic supporting members and the other end attached to the base in a cantilevered state. The mirror unit rotates and oscillates about a center of rotation as deformation of the drive bars is transmitted to the mirror unit through the elastic supporting members. The center of rotation of the mirror unit is within a range of −0.05×D to −0.01×D, where D denotes a diameter of the mirror unit.

20 Claims, 21 Drawing Sheets

(51) Int. Cl.
*G03B 21/28* (2006.01)
*G02B 27/01* (2006.01)
*G03G 15/04* (2006.01)
*G01S 7/481* (2006.01)
*G01S 17/93* (2006.01)

(56) References Cited

U.S. PATENT DOCUMENTS

| | | |
|---|---|---|
| 2006/0245023 A1 | 11/2006 | Akedo et al. |
| 2010/0309536 A1 | 12/2010 | Akanuma et al. |
| 2013/0070167 A1 | 3/2013 | Tagami et al. |
| 2013/0308173 A1 | 11/2013 | Muchow et al. |

FOREIGN PATENT DOCUMENTS

| | | |
|---|---|---|
| JP | 2005-308863 | 11/2005 |
| JP | 2010-128116 | 6/2010 |
| JP | 2011-018026 | 1/2011 |
| JP | 2011-95331 A | 5/2011 |
| JP | 2012-042666 | 3/2012 |
| JP | 2012-133242 | 7/2012 |
| JP | 2012-185314 | 9/2012 |
| JP | 2012-198298 | 10/2012 |
| JP | 2013-080068 | 5/2013 |
| WO | WO 2011/152215 A1 | 12/2011 |

OTHER PUBLICATIONS

K. Yamada, et al., "A novel asymmetric silicon micro-mirror for optical beam scanning display" The Eleventh Annual International Workshop on Micro Electro Mechanical Systems, XP010270215, 1998, pp. 110-115.

ROTATION CENTER
(D = 1.2 mm, RESONANCE FREQUENCY 20000 Hz)

DYNAMIC SURFACE DEFORMATION (P-P VALUE)

US 9,575,312 B2

LIGHT DEFLECTOR, AND DEVICES INCORPORATING THE SAME

CROSS-REFERENCE TO RELATED APPLICATION

This patent application is based on and claims priority pursuant to 35 U.S.C. §119(a) to Japanese Patent Application No. 2014-232757, filed on Nov. 17, 2014, in the Japan Patent Office, the entire disclosure of which is hereby incorporated by reference herein.

BACKGROUND

Technical Field

Embodiments of the present invention relate to a light deflector, and devices such as optical scanner, image forming apparatus, image projector, heads-up display, and a laser radar into each of which the light deflector is incorporated.

Background Art

Light deflectors created through micro-electromechanical systems (MEMS) processing using silicon materials are known in the art. In such light deflectors, a mirror unit, a pair of torsion bars, and drive bars are formed as a single integrated unit. The mirror unit has a light reflection plane, and is supported by the pair of torsion bars. Each of the drive bars has a piezoelectric member and its one end is attached to a base. The other ends of the torsion bars that are not attached to the mirror unit are supported by the free ends of the drive bars. The mirror unit enters a moment of rotation where the mirror unit rotates when the bending deformation caused to the drive bars by application of voltage is transmitted to the mirror unit through the torsion bars. When the mirror unit rotates, the torsion bars twist and deform, creating an elastic force that restores the mirror to its original state. As this series of processes is repeated, the mirror unit rotates and oscillates at a constant amplitude.

For example, a configuration is known in the art in which the center of the mirror unit is displaced towards the connecting part of the drive bars and the base with reference to the axis of the torsion bars. Due to such a configuration, the moment generated for the mirror unit by bending deformation of the drive bars increases, and the rotation amplitude (deflection angle) of the mirror unit can be increased. In this known configuration, the center of rotation of the mirror unit is placed at the approximate center of gravity of the mirror unit.

In order to increase diameter of the mirror unit, the angle of the amplitude of the mirror unit, or the resonance frequency, the amount of displacement of the torsion bars (such an amount of displacement may be referred to as an offset amount in the following description) needs to be increased with reference to the center of the mirror unit so as to increase the moment. However, when the offset amount is increased, the asymmetry of the torsion bars increases with reference to the mirror unit. As known in the art, the mirror unit is designed to rotate around the center of the mirror. For this reason, the axis of the torsion bars is offset from the center of rotation of the mirror unit when the offset amount is increased, and extra deformation force (e.g., bending force) is applied to the torsion bars in addition to the torsion around the axis of the torsion bars.

In other words, when the drive frequency of the mirror unit becomes as high as a few kHz to a few tens of kHz, the mirror unit, which is made of silicon material, may deform due to the undesired deforming force caused by the offset amount of the torsion bars, and there are some cases in which the optically-required precision of the plane of the light reflection plane cannot be maintained. If the precision of the plane of the mirror unit is degraded, the beam spot that is formed by the beam reflected at the light reflection plane deforms, and the resolution deteriorates, leading to a low image quality.

SUMMARY

Embodiments of the present invention described herein provide a light deflector including a mirror unit having a light reflection plane, a base, a pair of elastic supporting members each having one end attached to the mirror unit and the other end attached to the base and configured to support the mirror unit in a rotatable and oscillatable manner, and a pair of drive bars each having one end attached to another end of a corresponding one of the elastic supporting members and the other end attached to the base in a cantilevered state, the pair of drive bars being deformable in response to an external force. The mirror unit rotates and oscillates about a center of rotation as deformation of the drive bars is transmitted to the mirror unit through the elastic supporting members, and the center of rotation of the mirror unit is within a range of $-0.05 \times D$ to $-0.01 \times D$, where D denotes a diameter of the mirror unit and the minus denotes a direction opposite to a direction from fixed ends to free ends of the drive bars with reference to a center of the mirror unit.

BRIEF DESCRIPTION OF THE DRAWINGS

A more complete appreciation of exemplary embodiments and the many attendant advantages thereof will be readily obtained as the same becomes better understood by reference to the following detailed description when considered in connection with the accompanying drawings.

Figure 1:
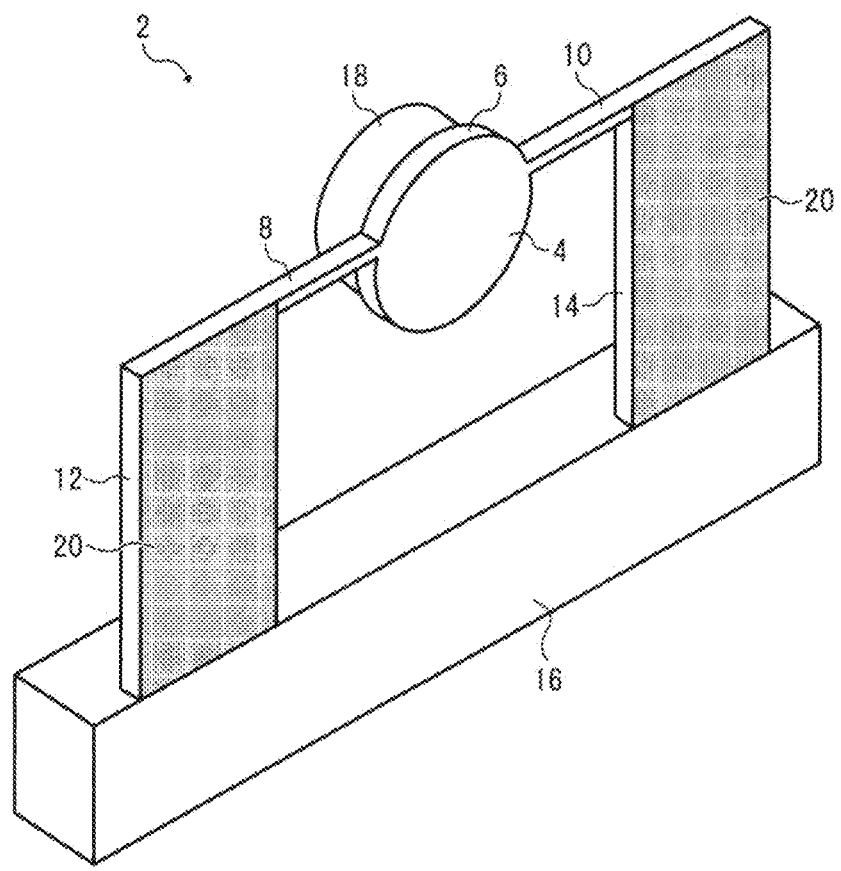
FIG. 1 is a perspective view of a light deflector according to a first embodiment of the present invention.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

Figure 2B:
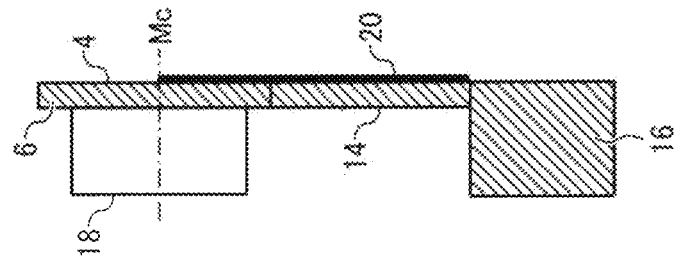
FIG. 2B is a sectional view along line B-B of FIG. 2A.
Figure 2A:
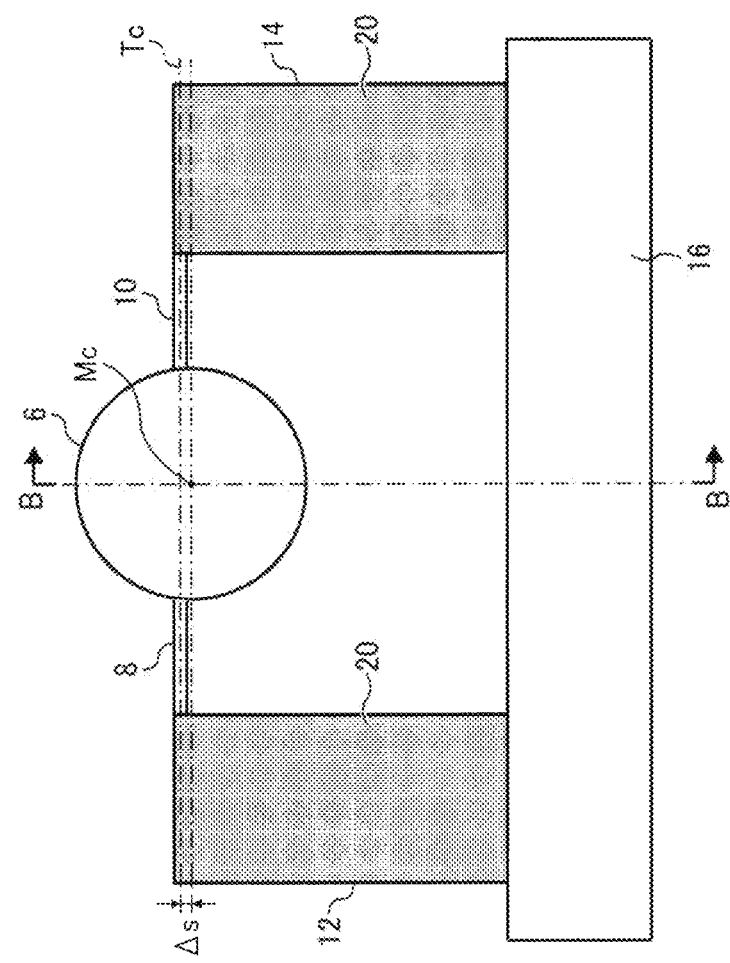
FIG. 2A is a front view of the light deflector of FIG. 1 viewed from a normal-line direction of the light reflection plane.

Embodiments of the present invention are described below with reference to the drawings. A first embodiment of the present invention is described with reference to FIG. 1 to FIG. 15B. As illustrated in FIG. 1, FIG. 2A, and FIG. 2B, a light deflector 2 according to the present embodiment is a deflection mirror that deflects light in one direction. The light deflector 2 includes a mirror unit 6 with a light reflection plane 4, torsion bars 8 and 10 that serve as a pair of elastic supporting members whose ends on one side are fixed to the mirror unit 6 to support the mirror unit 6 such that the mirror unit 6 can rotate and oscillate as desired, drive bars 12 and 14 that serve as bar-like members whose ends on one side are fixed to the other ends of the torsion bars 8 and 10, and a fixed base 16 on which the other ends of the drive bars 12 and 14 are fixed. On the other side of the mirror unit 6 on which the light reflection plane 4 is not provided, a cylindrical rib 18 is integrally formed.

The drive bars 12 and 14 are fixed to the fixed base 16 so as to project from the fixed base 16 in the same direction, and are attached to one side of the each of the torsion bars 8 and 10. More specifically, the mirror unit 6 and the torsion bars 8 and 10 are supported on the fixed base 16 like a cantilever, via the pair of drive bars 12 and 14.

A piezoelectric material 20 is fixed onto the surface of each of the drive bars 12 and 14 like a film, and the drive bars 12 and 14 and the piezoelectric material form a unimorph drive bar shaped like a rectangular flat plate as a whole. In the present embodiment, the mirror unit 6, the torsion bars 8 and 10, and the drive bars 12 and 14 are formed as a single integrated unit by micro-electromechanical systems (MEMS) processing using silicon materials. The light reflection plane 4 is formed on the mirror unit 6 by forming a thin film made of metal such as aluminum and silver on the surface of the silicon substrate. The mirror unit 6 enters a moment of rotation where the mirror unit 6 is rotated when the bending deformation caused to the drive bars 12 and 14 by application of voltage as external force is transmitted to the mirror unit 6 through the torsion bars 8 and 10 (the bending deformation of the drive bars 12 and 14 will be described later in detail). When the mirror unit 6 rotates, the torsion bars 8 and 10 twist and deform, generating an elastic force that restores the mirror unit 6 to its original state. As this series of processes is repeated, the mirror unit 6 rotates and oscillates at a constant amplitude.

In the following description, piezoelectric drive systems where driving is performed by a piezoelectric member are described. However, no limitation is intended thereby. For example, the drive bars may deform due to external force such as electrostatic force or electromagnetic force.

Figure 4B:
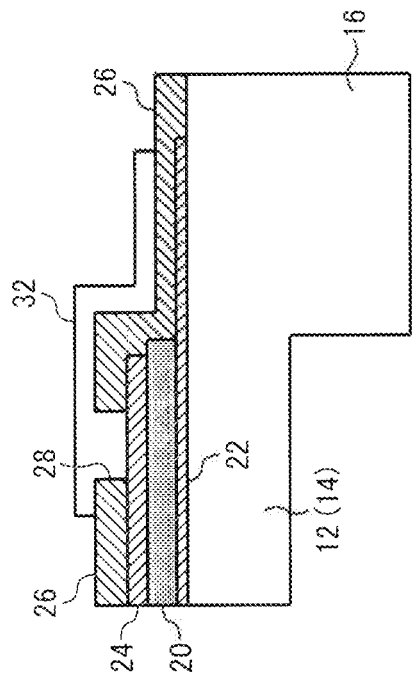
FIG. 4B is a sectional view along line B-B of FIG. 4A.
Figure 4C:
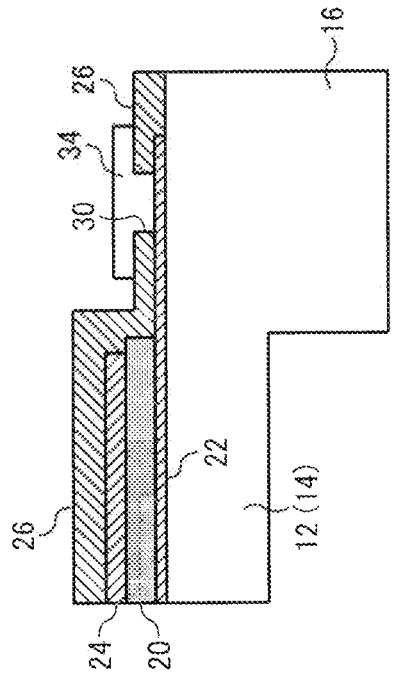
FIG. 4C is a sectional view along line C-C of FIG. 4A.
Figure 4A:
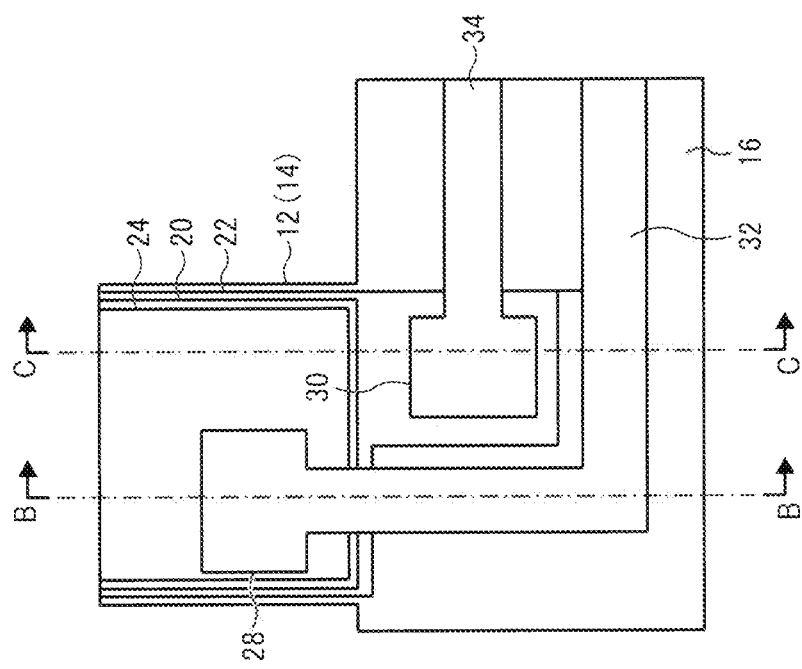
FIG. 4A is a plan view of the wiring for applying voltage, according to the first embodiment of the present invention.

The wiring for applying an electric field to the piezoelectric material 20 is omitted in FIG. 1 and FIG. 2, but the wiring is now described with reference to FIG. 4A, FIG. 4B, and FIG. 4C. FIG. 4A is a plan view of the wiring pattern near the edges of the drive bars on the fixed base 16 side, according to the present embodiment. FIG. 4B is a sectional view along line B-B of FIG. 4A. FIG. 4C is a sectional view along line C-C of FIG. 4A. As illustrated in FIGS. 4A, 4B, and 4C, a lower electrode 22 is provided on the surface of the drive bars 12 and 14, and the piezoelectric material 20 and an upper electrode 24 are further provided thereupon. On the top surface, an insulating layer 26 is provided. The lower electrode, the piezoelectric material, and the upper electrode are formed in multilayer and stacked above the drive bars by sputtering, and etching is performed so as to remove unnecessary portions. The adhesive layer may be made of titan (Ti), and the upper electrode and the lower electrode may be made of platinum (Pt). Moreover, the piezoelectric material may be made of lead zirconate titanate (PZT). In FIG. 4A, FIG. 4B, and FIG. 4C, reference signs 28 and 30 indicate contact holes, and reference signs 32 and 34 indicate aluminum wiring (the sectional views of these elements are not omitted).

The wiring for applying voltage to the piezoelectric material 20 is connected to a center area of the pair of the drive bars 12 and 14. In FIG. 4A, the insulating layer 26 is omitted. When the wiring is derived from the land as described above and a voltage is applied between the upper electrode 24 and the lower electrode 22, the volume of the piezoelectric material 20 changes due to electrostrictive characteristics, and the piezoelectric material 20 expands and contracts towards and away from the surface of the drive bars, thus bending and deforming the drive bars 12 and 14. Voltage with sinusoidal waveform is applied to the piezoelectric material 20 such that the pair of drive bars 12 and 14 repeat bending deformation approximately in a normal-line direction of the light reflection plane 4 of the mirror unit 6 and oscillate.

As illustrated in FIG. 2, the axis Tc of the torsion bars 8 and 10 is offset from the center Mc of the mirror unit 6. More specifically, the center Mc of the mirror unit 6 is offset from the axis Tc of the torsion bars 8 and 10 towards the fixed base 16. For this reason, the mirror unit 6 enters a rotating moment when the bending deformation caused to the drive bars 12 and 14 causes oscillation. Accordingly, the mirror unit 6 can be rotated and oscillated with greater amplitude. When the mirror unit 6 rotates and oscillates, the torsion bars 8 and 10 that support the mirror unit 6 twist and deform mainly around the axis.

In the present embodiment, example cases in which the piezoelectric material 20 is formed by film formation processes. However, no limitation is indicated thereby, and the piezoelectric material 20 may be formed by pasting any bulk material.

Because the torsion bars 8 and 10 and the drive bars 12 and 14 are arranged such that the longer-side directions are approximately orthogonal to each other, the rotational power that is caused by the bending deformation of the drive bars 12 and 14 can efficiently be converted into deformation power of the torsion bars 8 and 10 in twisting directions. Because the drive bars 12 and 14 support the torsion bars 8 and 10 on the free end sides like a cantilever, the mirror unit 6 can oscillate at large amplitude.

Figure 3:
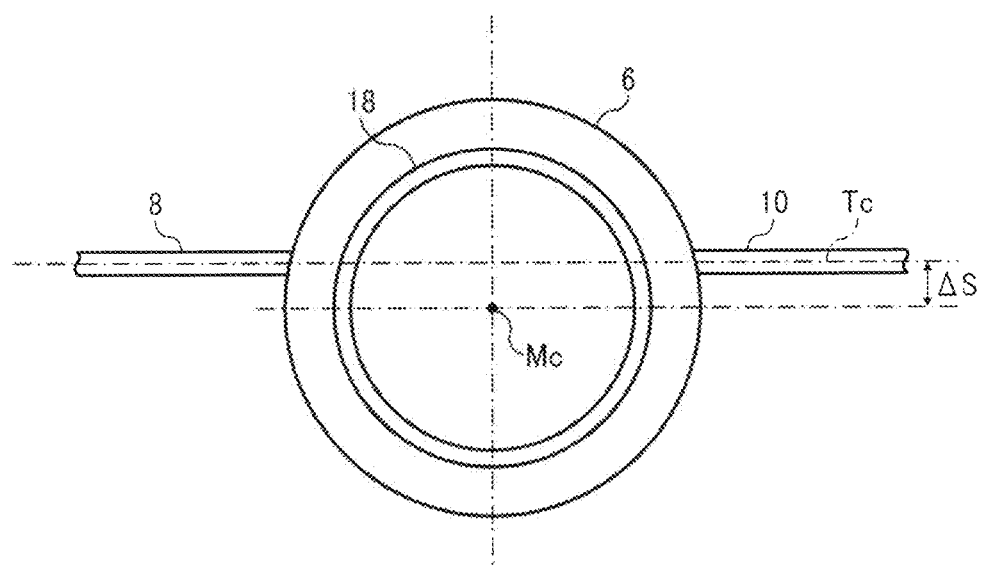
FIG. 3 is a rear view of a mirror unit according to the first embodiment of the present invention.

When the mirror unit 6 rotates and oscillates in wide amplitude and at high speed, the light reflection plane 4 of the mirror unit 6 that is made of silicon deforms, and there are some cases in which the optically-required precision of the plane of the light reflection plane 4 cannot be maintained. On the other side of the mirror unit 6 with which the light reflection plane 4 is not provided, the cylindrical rib 18 that enhance the mechanical strength of the mirror unit 6 to reduce the distortion of the light reflection plane 4 is integrally formed. As illustrated in FIG. 3, the center Rc of the cylindrical rib 18 is arranged so as to match the center Mc of the mirror unit 6. FIG. 3 is a rear view of the mirror unit 6 (i.e., a view from the other side of the light reflection plane) according to the present embodiment. In FIG. 3, the reference sign Δs indicates the offset amount of the torsion bars with reference to the center Mc of the mirror unit 6.

When the diameter of the mirror unit is increased, the angle of the amplitude of the mirror unit is increased, or the resonance frequency (operation frequency) is increased in order to improve the performance of an optical scanner as described above, the offset amount of the torsion bars needs to be increased with reference to the center of gravity (i.e., center position) of the mirror unit. However, when the offset amount is increased, the asymmetry level of the torsion bars increases with reference to the mirror unit, rendering the mirror unit susceptible to breakage or failure. As known in the art, the mirror unit is designed to rotate around the center of the mirror. For this reason, when the offset amount of the torsion bars is increased, the axis Tc of the torsion bars is offset from the center of rotation of the mirror unit, and extra deformation force (e.g., bending force) tends to be applied to the torsion bars in addition to the torsion around the axis of the torsion bars. When the offset amount of the torsion bars is not appropriate, the light reflection plane 4 of the mirror unit 6 dynamically deforms at rotation and oscillation even with the reinforcement by the cylindrical rib 18, and there are some cases in which the optically-required precision of the plane of the light reflection plane 4 cannot be maintained.

When eigenvalue analysis (modal analysis) is performed for the light deflector described above, the following two natural-oscillation modes where the frequency and oscillation mode differs are determined. In a first mode where the resonance frequency is low, the torsion bars and the drive bars bend and deform, the entirety of the mirror unit 6 deforms towards the normal-line direction of the light reflection plane, i.e., towards the thickness direction of the mirror unit 6. In a second mode where the resonance frequency is high, almost no bending deformation occurs to the torsion bars, but the torsion bars twist and the mirror unit rotates on the axis of the torsion bars. In the present embodiment, the resonance in the second mode is utilized to operate the mirror unit. It is to be noted that the resonance frequency in the first mode and the second mode is adjustable by varying the dimensions of the components, but the first mode is designed to have higher resonance frequency than that of the second mode.

Figure 5A:
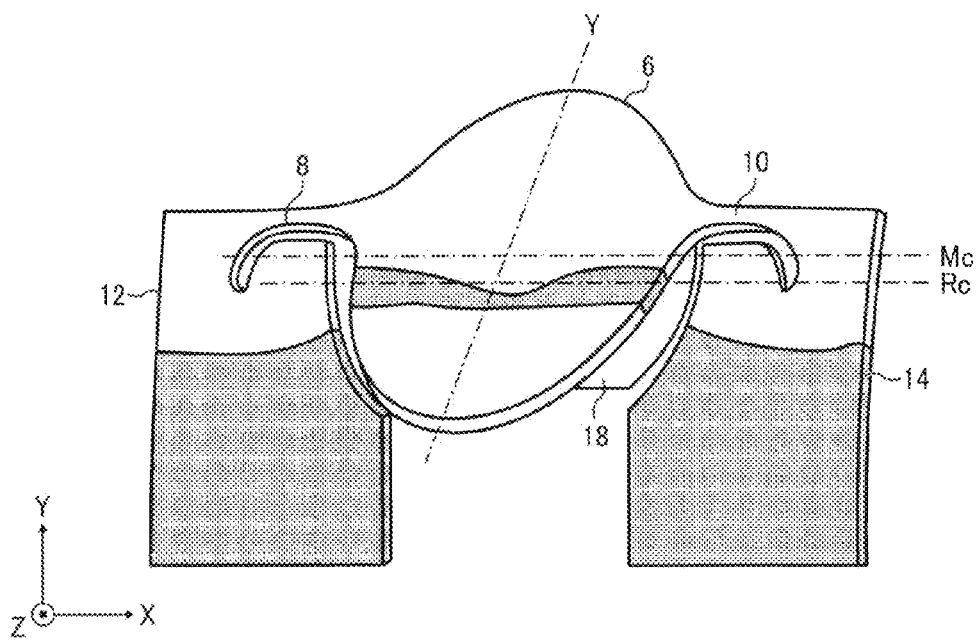
FIG. 5A is a diagram of a light deflector in a second mode of modal analysis simulation, according to the first embodiment of the present invention.
Figure 5B:
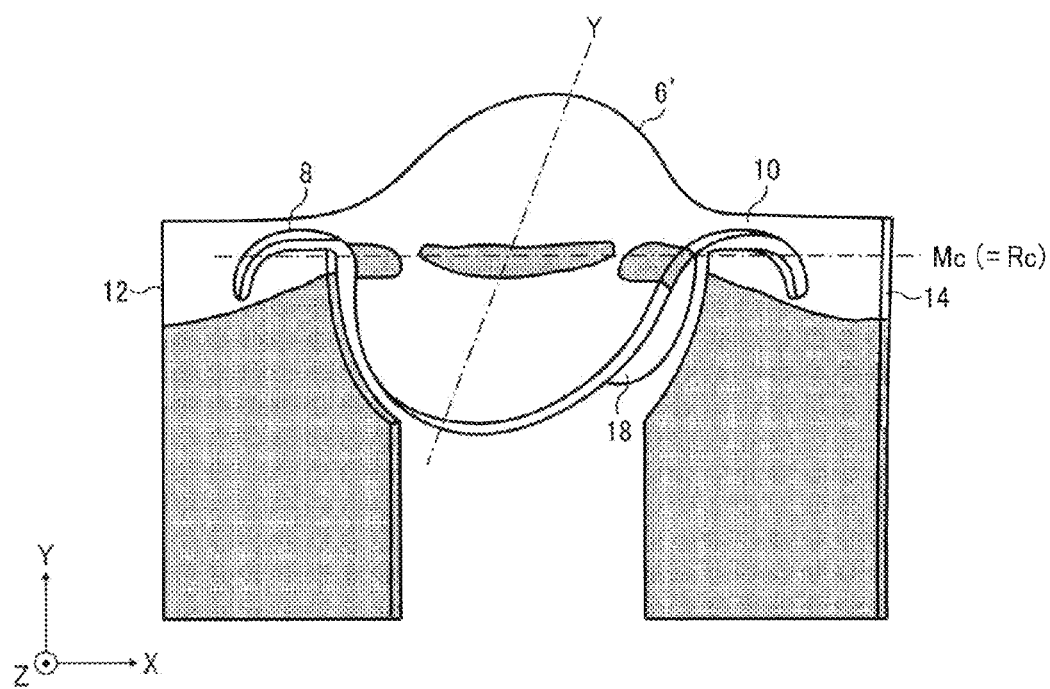
FIG. 5B is a diagram of a light deflector in a first mode of modal analysis simulation, according to the conventional art.
Figure 6A:
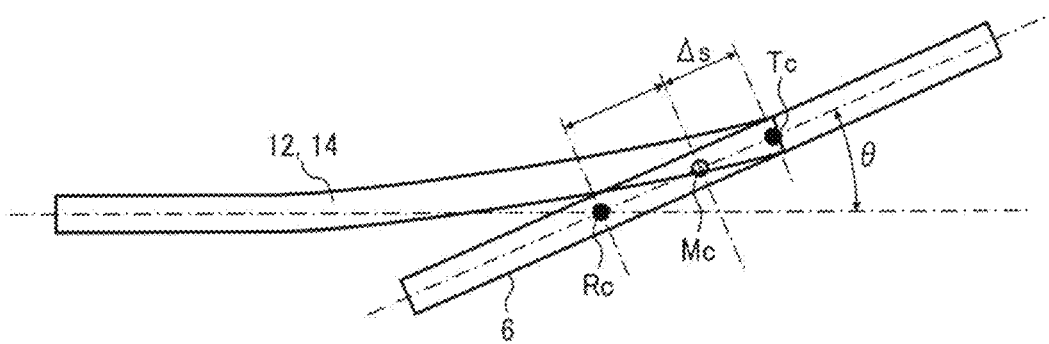
FIG. 6A illustrates the relation between the bending deformation of drive bars and the rotation of a mirror unit, according to the first embodiment of the present invention.
Figure 6B:
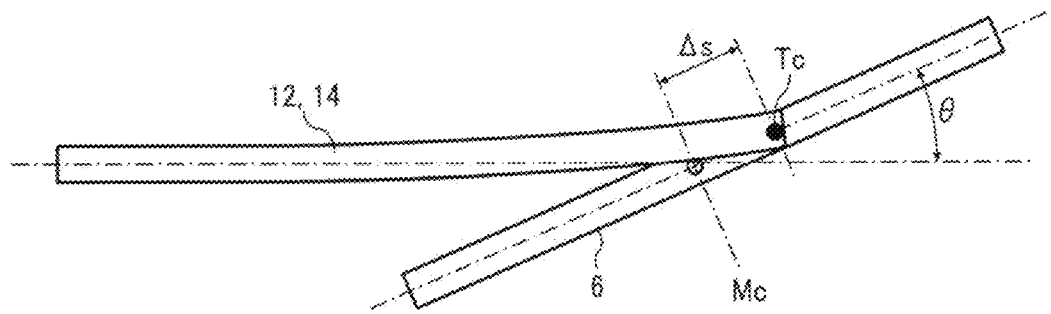
FIG. 6B illustrates the relation between the bending deformation of drive bars and the rotation of a mirror unit, according to the conventional art.

In the present embodiment, as illustrated in FIG. 5A, the light deflector 2 is configured such that the center of rotation Rc of the mirror unit 6, where the displacement in the normal-line direction of the light reflection plane 4 (Z direction) is zero, is displaced from the center Mc of the mirror unit 6 to the fixed edges of the drive bars 12 and 14. According to the experiments run by the inventors, it was found that the dynamic surface deformation when the mirror unit 6 rotates and oscillates can be reduced by offsetting the center of rotation Rc of the mirror unit 6 from the center Mc of the mirror unit 6 to the fixed edges of the drive bars 12 and 14. The reasons why the dynamic surface deformation can be reduced are described later. The portions with dots in FIG. 5A and FIG. 5B indicate the portions where the displacement in the Z direction becomes zero. In the conventional art, as illustrated in FIG. 5B, the center of rotation Rc of the mirror unit 6' matches the center Mc of the mirror unit 6'. FIG. 6A and FIG. 6B illustrate the relation between the bending deformation of the drive bars 12 and 14 and the rotation of the mirror unit 6 in the second mode. Note that FIG. 6A and FIG. 6B correspond to FIG. 5A and FIG. 5B, respectively.

First Example

In a first example, assuming that the Y direction from the fixed ends to the free ends of the drive bars is the + direction, the center of rotation Rc of the mirror unit 6 is offset by −34 micrometer (μm) towards the fixed ends of the drive bars 12 and 14 with reference to the center Mc of the mirror unit 6. The diameter D of the mirror unit 6 is 1.2 millimeters (mm), and the resonance frequency is 20 kilohertz (kHz).

Figure 7A:
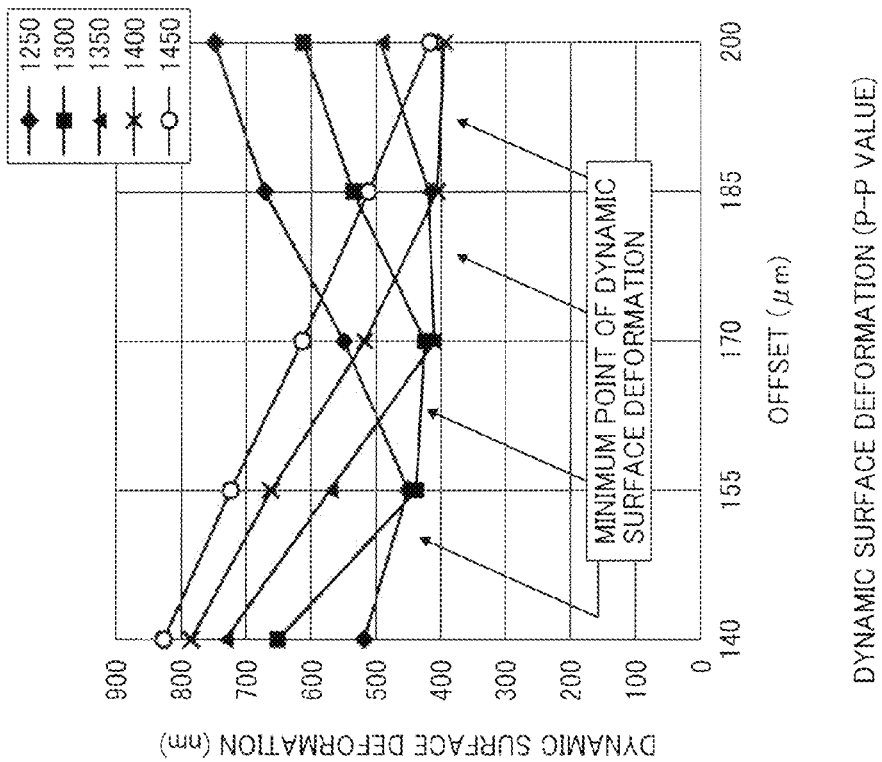
FIG. 7A is a graph illustrating the changes in the position of the center of rotation when the length of drive bars and the offset amount of torsion bars are varied, according to a first example of the present invention.
Figure 7B:
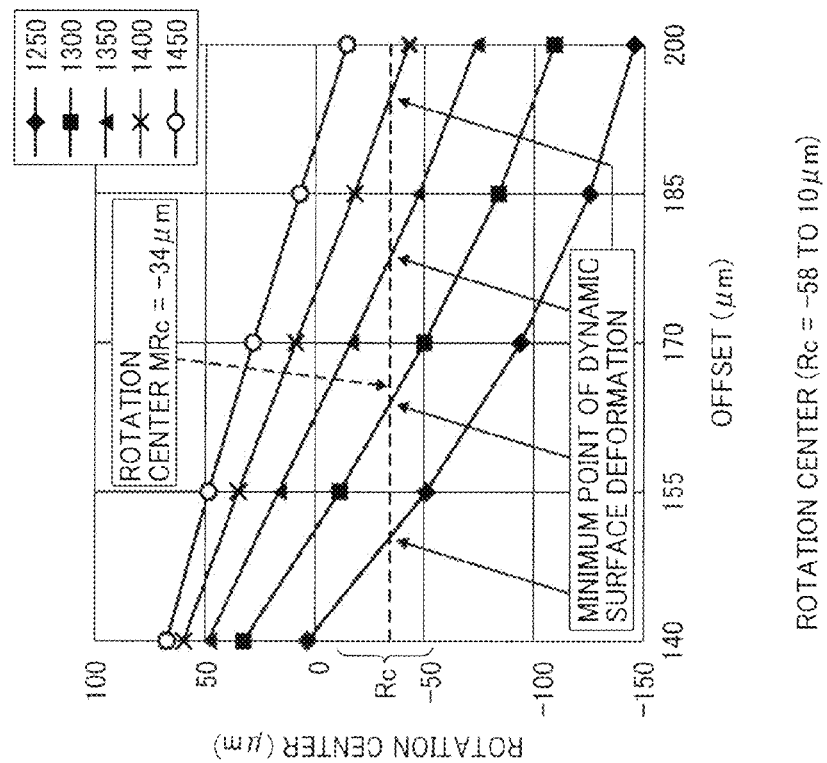
FIG. 7B is a graph illustrating the changes in dynamic surface deformation when the length of drive bars and the offset amount of torsion bars are varied, according to the first example of the present invention.
Figure 8:
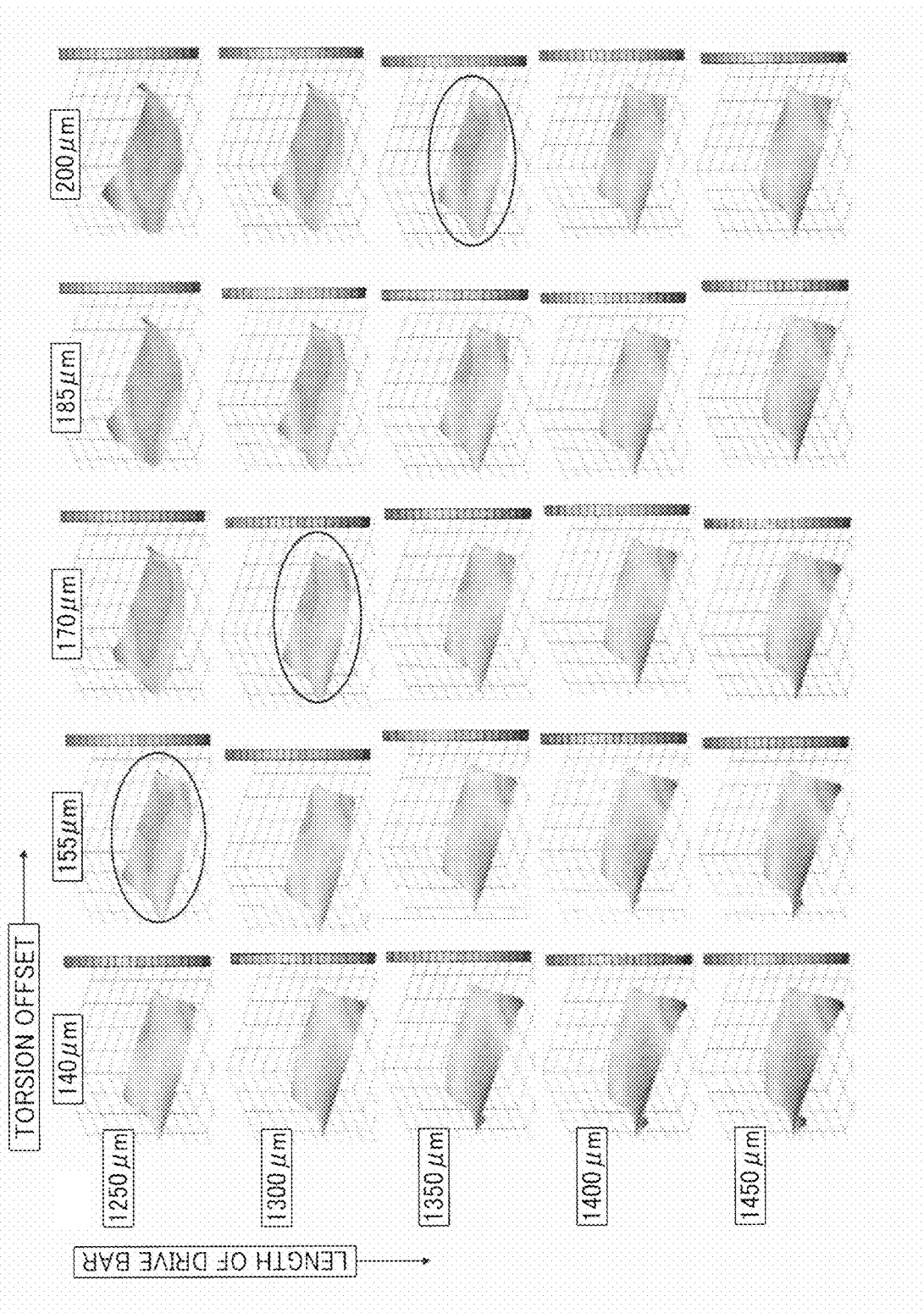
FIG. 8 is a contour diagram illustrating the shape of the dynamic surface deformation of a light reflection plane when the length of drive bars and the offset amount of torsion bars are varied, according to the first example of the present invention.

The position of the rotation center Rc is controllable by varying the offset amount of the torsion bars and the length of the drive bars. FIG. 7A indicates the position of the center of rotation Rc, where the length of the drive bars is the parameters and the horizontal axis is the offset amount of the torsion bars. FIG. 7B indicates the dynamic surface deformation (peak-to-peak value), where the length of the drive bars is the parameters and the horizontal axis is the offset amount of the torsion bars. For the purposes of simplification, a peak-to-peak value is referred to as a p-p value in the following description. FIG. 8 is a computer-simulated image used to calculate the amount of the dynamic surface deformation (p-p value) plotted in FIG. 7B, and illustrates the deformed shapes of the light reflection plane 4 of the mirror unit 6.

In FIG. 8, the length of the drive bars is divided into the five levels of 1250 μm, 1300 μm, 1350 μm, 1400 μm, and 1450 μm. Moreover, the offset amount of the torsion bars are varied to the five levels of 140 μm, 155 μm, 170 μm, 185 μm, and 200 μm, in each level of the length of the drive bars. In FIG. 7B, the amounts of dynamic surface deformation caused by the drive bars are plotted for each of the offset amounts. In actuality, FIG. 8 is a contour diagram that is gradationally colored, where the plus direction and the minus direction of the Y direction are colored in red and blue, respectively. In FIG. 7B, the sum of the peak amount of deformation on the plus side and the peak amount of deformation (absolute value) on the minus sides is plotted as the amount of dynamic surface deformation. For example, when the length of the drive bars is 1250 μm, as illustrated in FIG. 7B, the dynamic surface deformation has the minimum point at the point where the offset amount is at 155 μm.

As illustrated in FIG. 7A, the center of rotation Rc that corresponds to the minimum points of the dynamic surface deformation of the drive bars illustrated in FIG. 7B is ranging from −58 to −10 μm. The optimal center of rotation MRc of the center of rotation Rc of the mirror unit 6, which can minimize the dynamic surface deformation of the light reflection plane, is −34 μm that is in the middle of the range from −58 to −10 μm, or in the proximity of −34 μm. This indicates that the dynamic surface deformation (p-p value) can be minimized by arranging the center of rotation Rc of the mirror unit 6 at the position of −34 μm. When the position of the center of rotation Rc is determined, the optimal offset amount of the torsion bars that is uniquely determined for each length of the drive bars. As is apparent from FIG. 7B, the amount of the dynamic surface deformation has almost the same minimum value (minimum point) regardless of the length of the drive bars.

In FIG. 7B, the relative minimums of the amount of the dynamic surface deformation draw a relatively gentle curve that is convex downward. When the center of rotation is within the range of −58 to −10 μm, an increase in the amount of the dynamic surface deformation remains within about a 10 to 20 percent increase with reference to the minimum value. For this reason, when the position of the center of rotation Rc is arranged within the above range, the amount of the dynamic surface deformation of the mirror unit 6 is reduced. Accordingly, the optically-required precision of the mirror surface can be maintained. As illustrated in FIG. 7A and FIG. 7B, the position of the center of rotation Rc is out of the above range, the amount of the dynamic surface deformation sharply increases by 1.5 or 2.0 in comparison with the minimum value.

As described above, the resonance frequency is increased by displacing the center of rotation of the mirror unit 6 within an adequate range. Accordingly, the speed is enhanced, and the angle of the amplitude (scanning angle) can be increased.

Second Example

The second example of the present invention is described with reference to FIG. 9A, FIG. 9B, and FIG. 10. The matters that have been described above with reference to the first example are omitted. Depending on the type of application or its specification for which the light deflector is provided, the properties and characteristics that are required for the light deflector vary. In the second example, the diameter of the mirror unit 6 and the resonance frequency are different from those of the first example. In the second example, the diameter D of the mirror unit 6 is 1.4 mm, and the resonance frequency is 26 kHz.

Figure 9B:
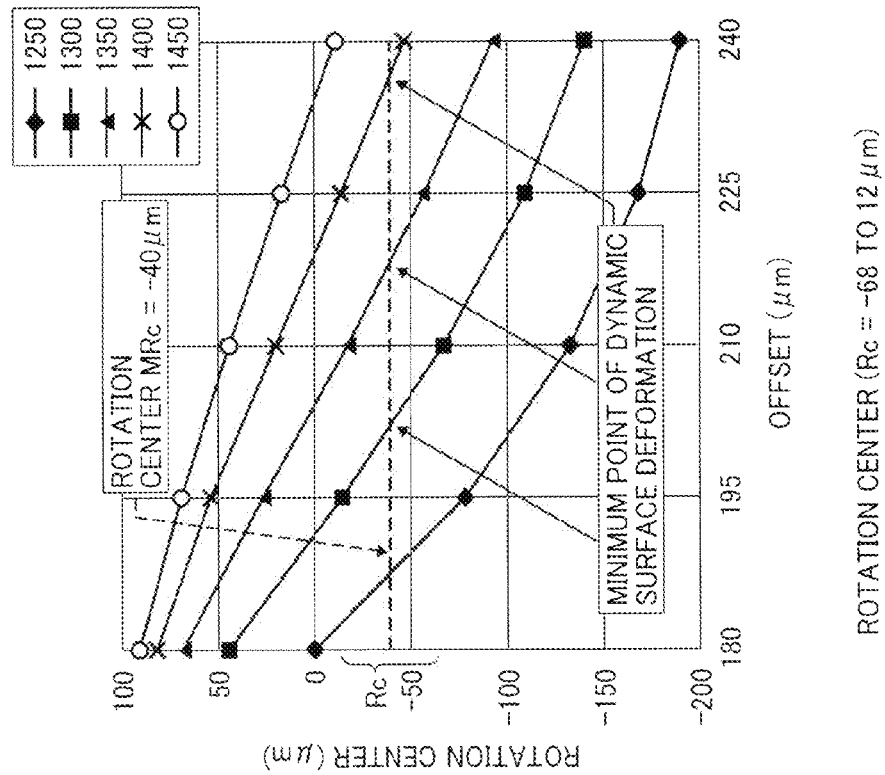
FIG. 9B is a graph illustrating the changes in dynamic surface deformation when the length of drive bars and the offset amount of torsion bars are varied, according to the second example of the present invention.
Figure 10:
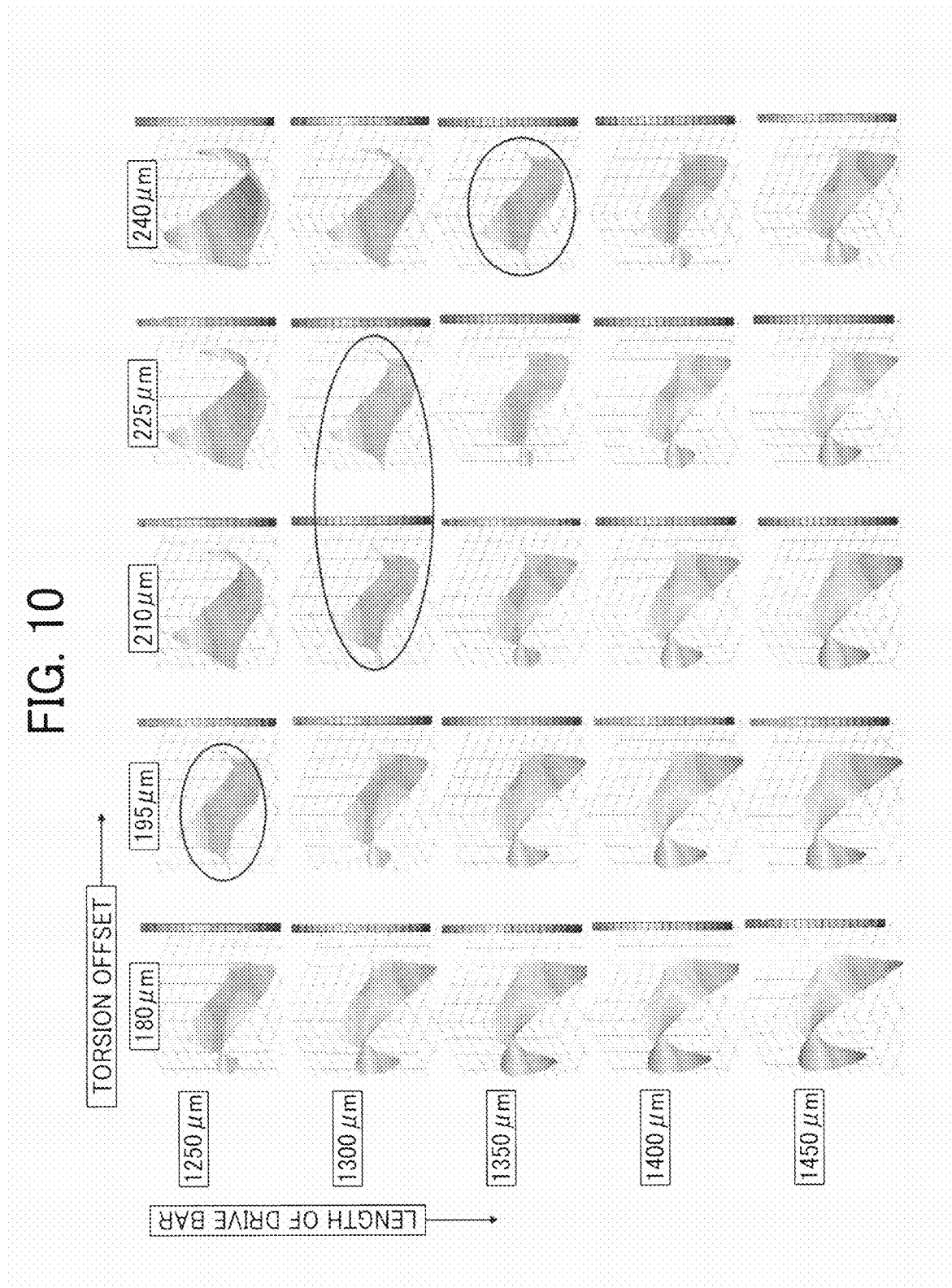
FIG. 10 is a contour diagram illustrating the shape of the dynamic surface deformation of a light reflection plane when the length of drive bars and the offset amount of torsion bars are varied, according to the second example of the present invention.

As illustrated in FIG. 10, the levels of the classification of the length of the drive bars are the same as those of the first example described above, but the offset amount of the torsion bars are changed to the five levels of 180 μm, 195 μm, 210 μm, 225, μm, and 240 μm, respectively. In FIG. 9B, the amounts of dynamic surface deformation caused by the drive bars are plotted for each of the offset amounts. For example, when the length of the drive bars is 1250 μm, as illustrated in FIG. 9B, the dynamic surface deformation has the minimum point at the point where the offset amount is at 195 μm.

Figure 9A:
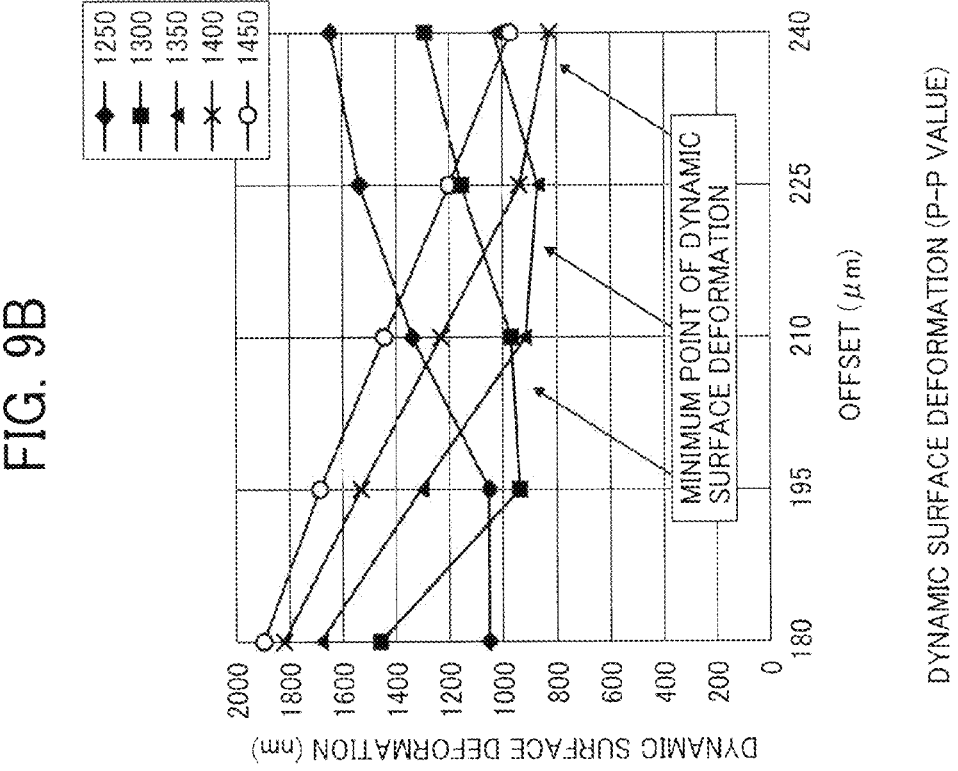
FIG. 9A is a graph illustrating the changes in the position of the center of rotation when the length of drive bars and the offset amount of torsion bars are varied, according to a second example of the present invention.

As illustrated in FIG. 9A, the center of rotation Rc that corresponds to the minimum points of the dynamic surface deformation of the drive bars illustrated in FIG. 9B is ranging from −68 to −12 μm. The optimal center of rotation MRc of the center of rotation Rc of the mirror unit 6, which can minimize the dynamic surface deformation of the light reflection plane, is −40 μm that is in the middle of the range from −68 to −12 μm.

Third Example

The third example of the present invention is described with reference to FIG. 11A, FIG. 11B, and FIG. 12. The matters that have been described above with reference to the first example are omitted. In the third example, the diameter D of the mirror unit 6 is 1.6 mm, and the resonance frequency is 32,000 hertz (Hz). As illustrated in FIG. 12, the levels of the classification of the length of the drive bars are the same as those of the first example described above, but the offset amount of the torsion bars are changed to 210 μm, 225 μm, 240 μm, 255, μm, and 270 μm, respectively. In FIG. 11B, the amounts of dynamic surface deformation caused by the drive bars are plotted for each of the offset amounts. For example, when the length of the drive bars is 1250 μm, as illustrated in FIG. 11B, the dynamic surface deformation has the minimum point at the point where the offset amount is at 225 μm.

Figure 11A:
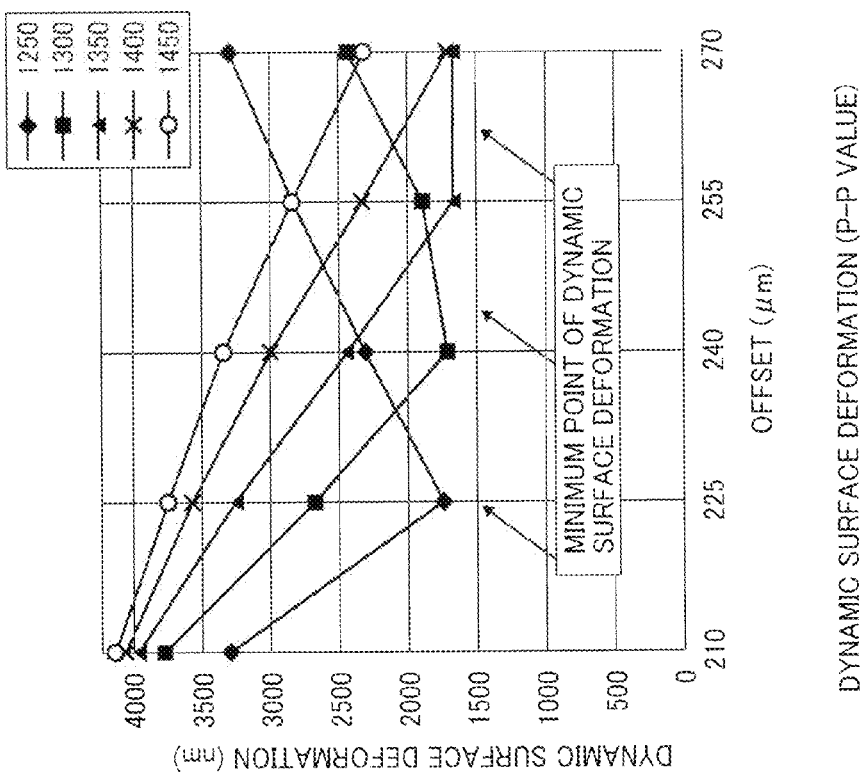
FIG. 11A is a graph illustrating the changes in the position of the center of rotation when the length of drive bars and the offset amount of torsion bars are varied, according to a third example of the present invention.
Figure 11B:
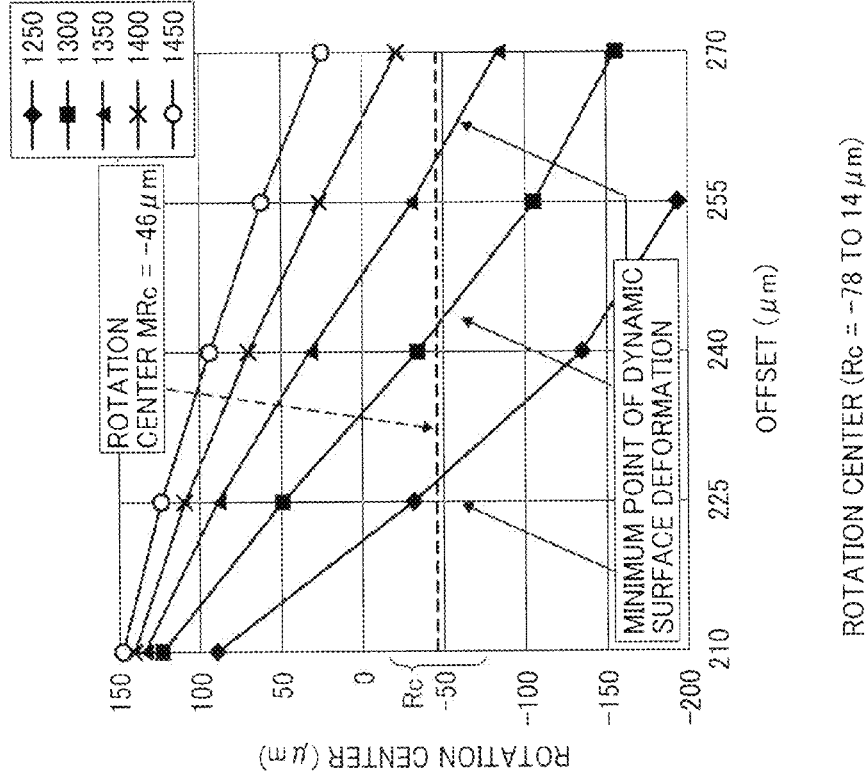
FIG. 11B is a graph illustrating the changes in dynamic surface deformation when the length of drive bars and the offset amount of torsion bars are varied, according to the third example of the present invention.
Figure 12:
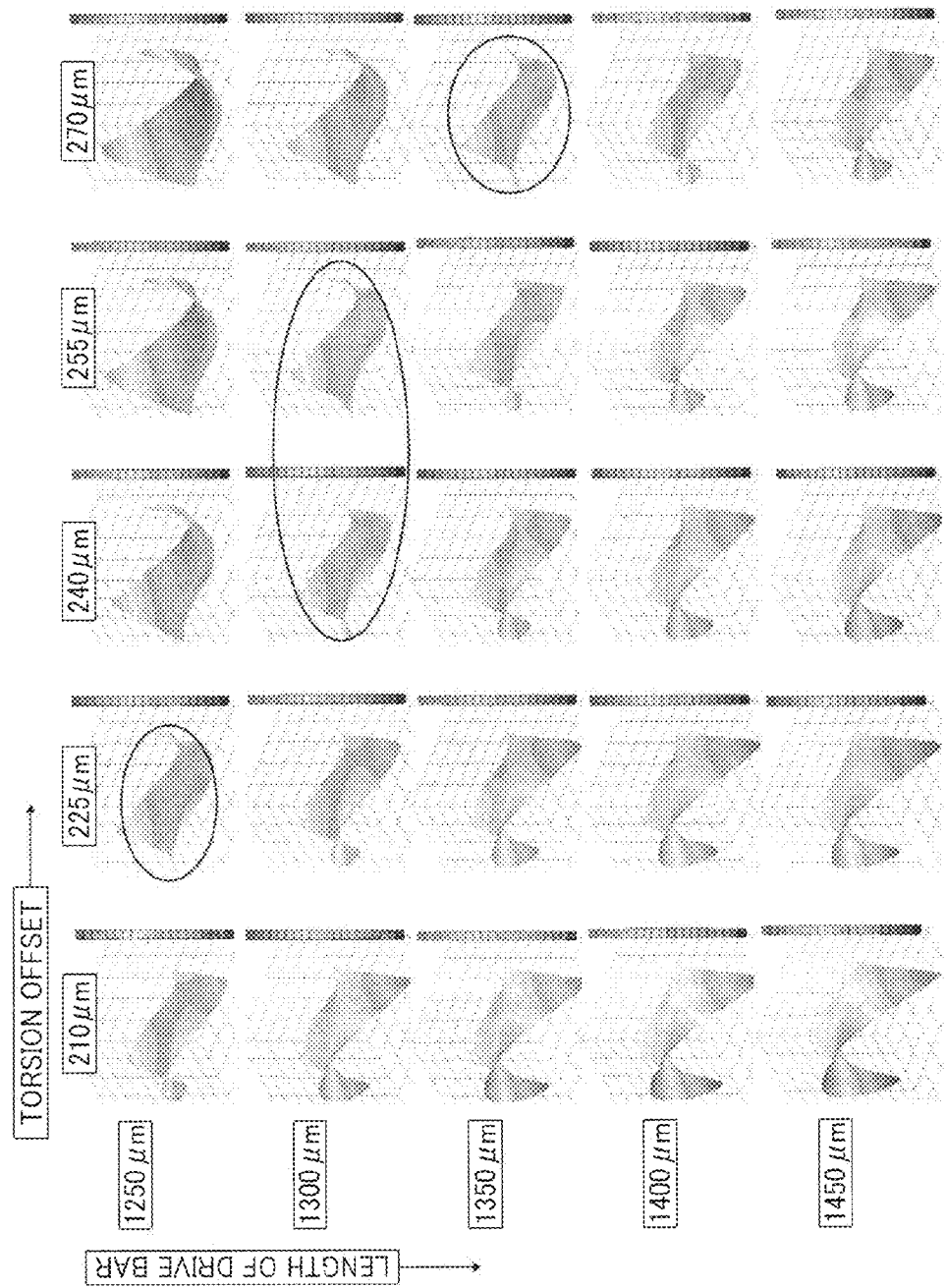
FIG. 12 is a contour diagram illustrating the shape of the dynamic surface deformation of a light reflection plane when the length of drive bars and the offset amount of torsion bars are varied, according to the third example of the present invention.
Figure 13A:
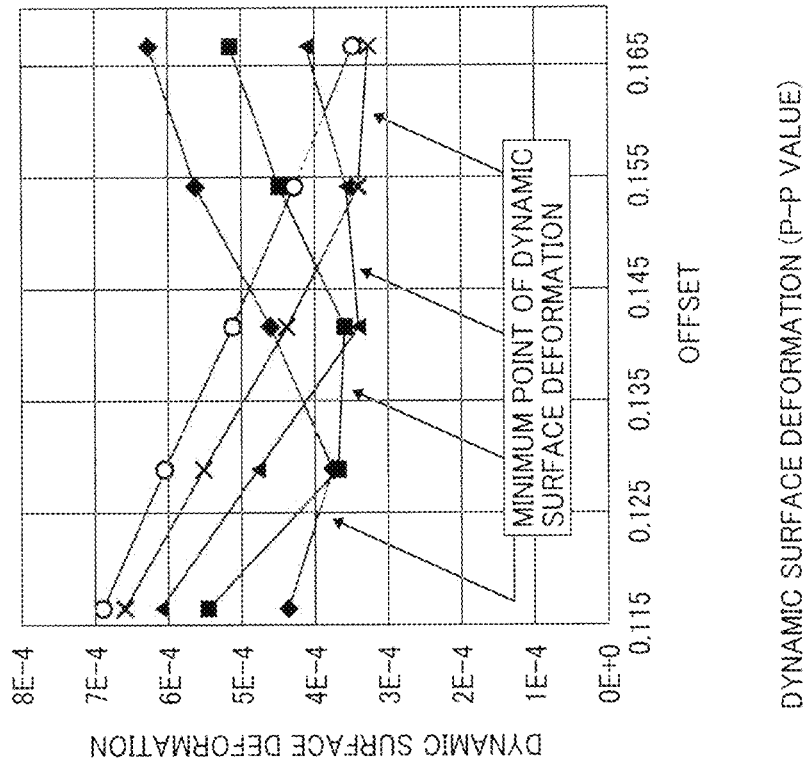
FIG. 13A is a graph obtained by making the graph of FIG. 7A become nondimensional.
Figure 13B:
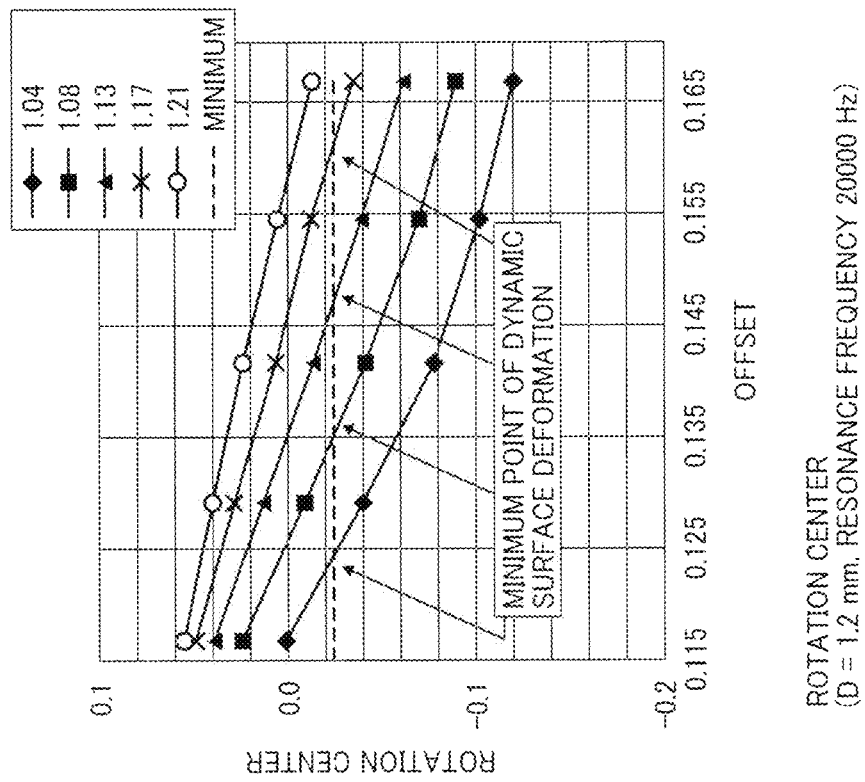
FIG. 13B is a graph obtained by making the graph of FIG. 7B become nondimensional.
Figure 14A:
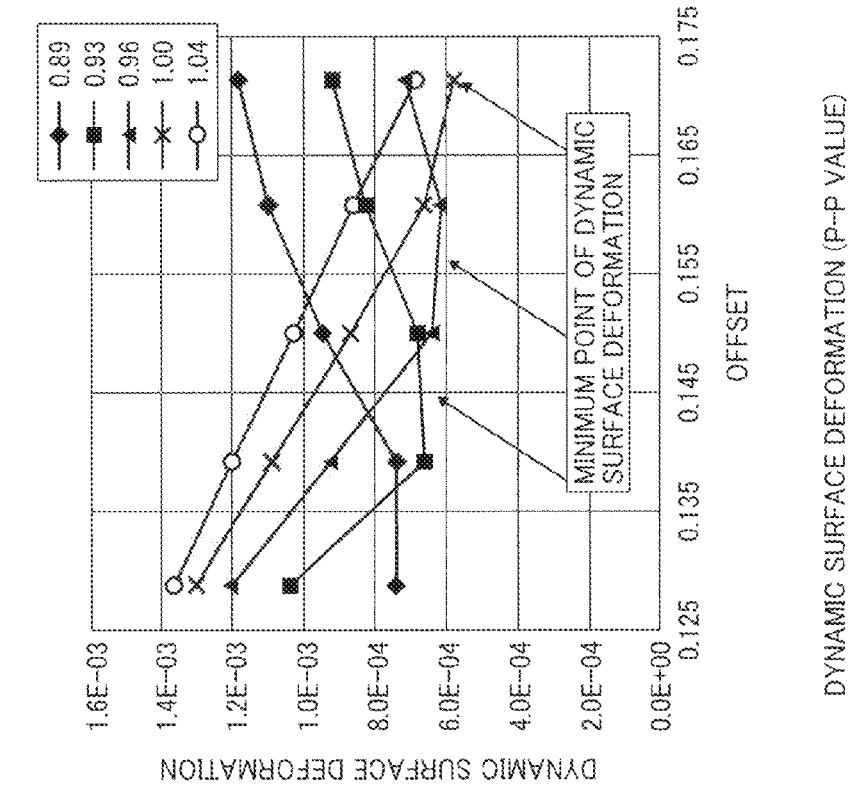
FIG. 14A is a graph obtained by making the graph of FIG. 9A become nondimensional.
Figure 14B:
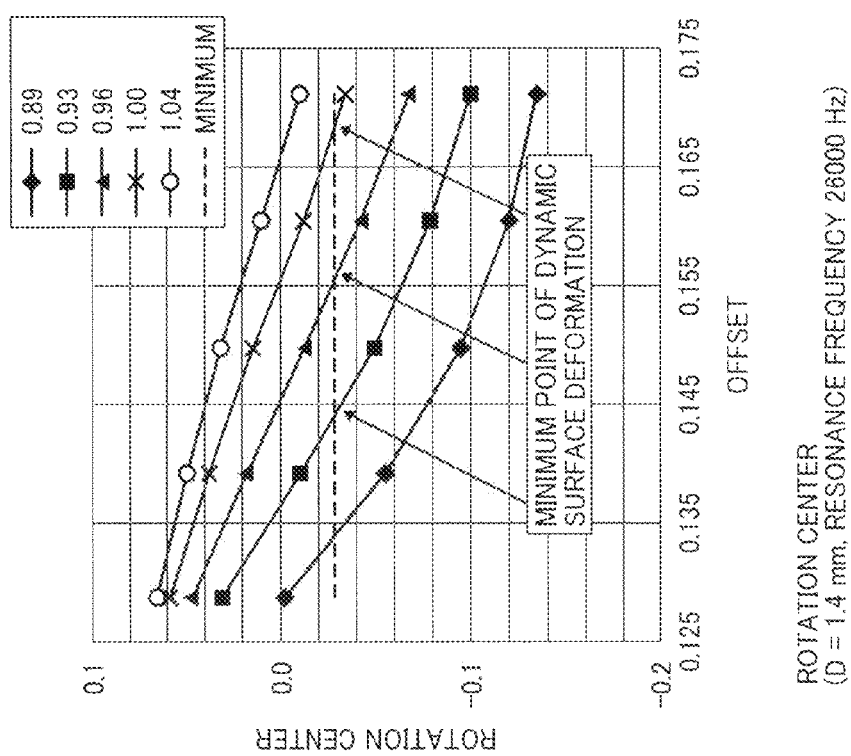
FIG. 14B is a graph obtained by making the graph of FIG. 9B become nondimensional.
Figure 15A:
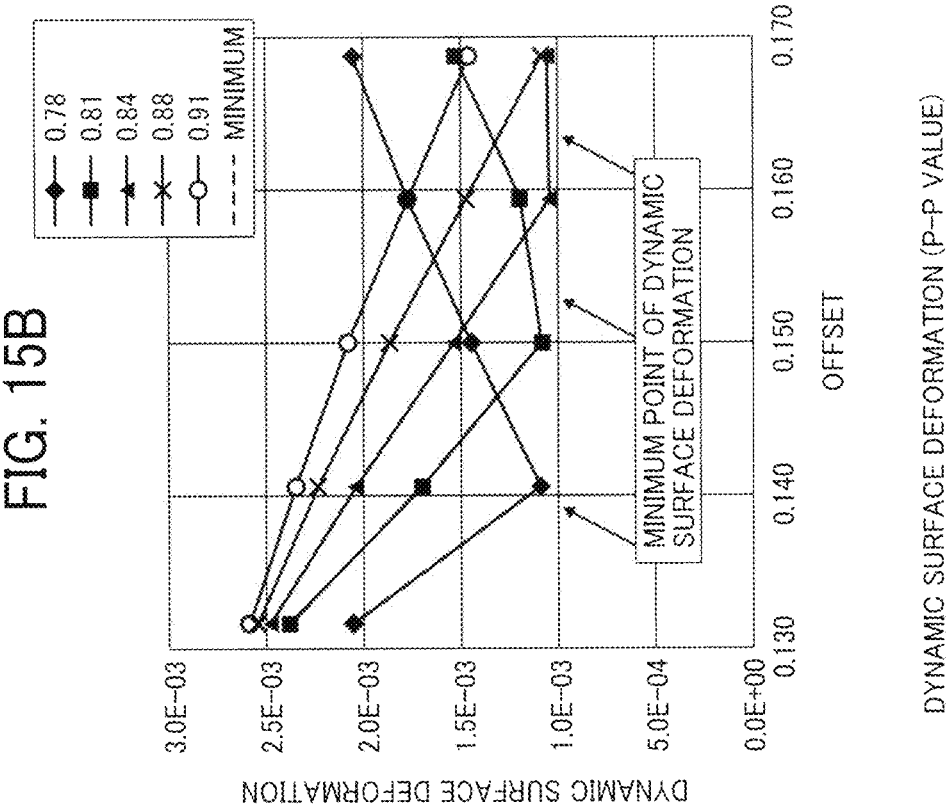
FIG. 15A is a graph obtained by making the graph of FIG. 11A become nondimensional.
Figure 15B:
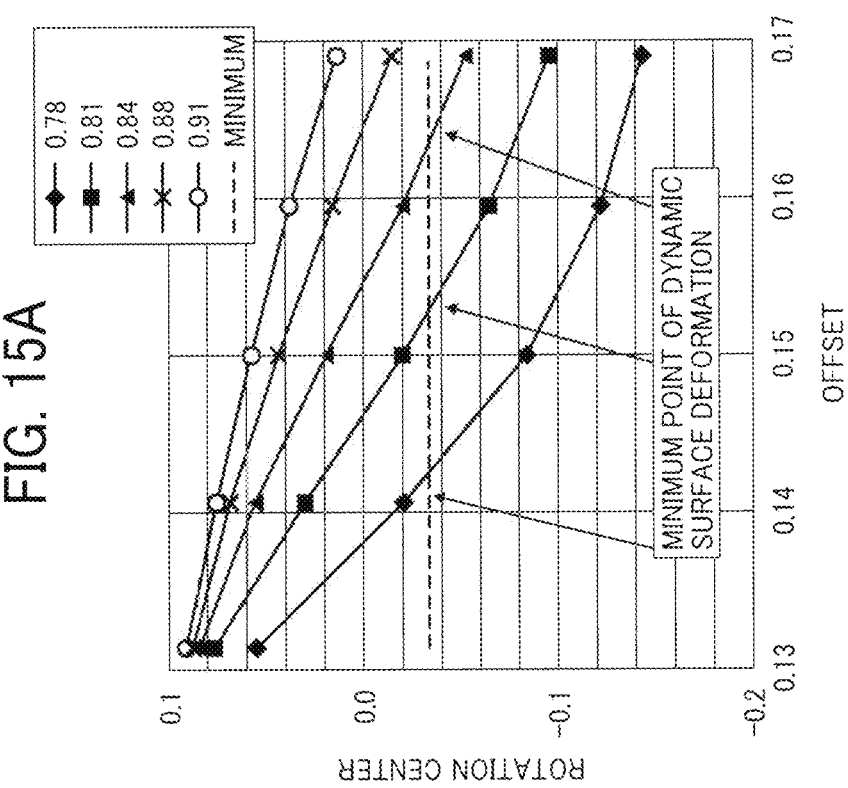
FIG. 15B is a graph obtained by making the graph of FIG. 11B become nondimensional.

As illustrated in FIG. 11A, the center of rotation Rc that corresponds to the minimum points of the dynamic surface deformation of the drive bars illustrated in FIG. 11B is ranging from −78 to −14 μm. The optimal center of rotation MRc of the center of rotation Rc of the mirror unit 6, which can minimize the dynamic surface deformation of the light reflection plane, is −46 μm that is in the middle of the range from −78 to −14 μm.

In comparison to the first example, the center of rotation where the dynamic surface deformation becomes minimum (i.e., the offset amount with reference to the center of the mirror unit) in the second example and the third example takes a slightly different value. For this reason, the graphs of FIG. 7A, FIG. 7B, FIG. 9A, FIG. 9B, FIG. 11A, and FIG. 11B are made nondimensional with the diameter (μm) of the mirror unit 6, and depicted in FIG. 13A, FIG. 13B, FIG. 14A, FIG. 14B, FIG. 15A, and FIG. 15B, respectively. In the graphs in FIG. 13A, FIG. 13B, FIG. 14A, FIG. 14B, FIG. 15A, and FIG. 15B, the dynamic surface deformation becomes minimum when the center of rotation is at about −0.03×D. Accordingly, even when the resonance frequency or the diameter of the mirror unit varies, the dynamic surface deformation may be reduced by arranging the center of rotation at −0.03×D or at an optimal position in the proximity of −0.03×D. When the center of rotation is within a range of −0.05×D to −0.01×D, an increase in the amount of the dynamic surface deformation remains within a 10 to 20 percent increase with reference to the minimum value. For this reason, when the position of the center of rotation is arranged within the above range, the amount of the dynamic surface deformation of the mirror unit can be reduced.

Figure 16:
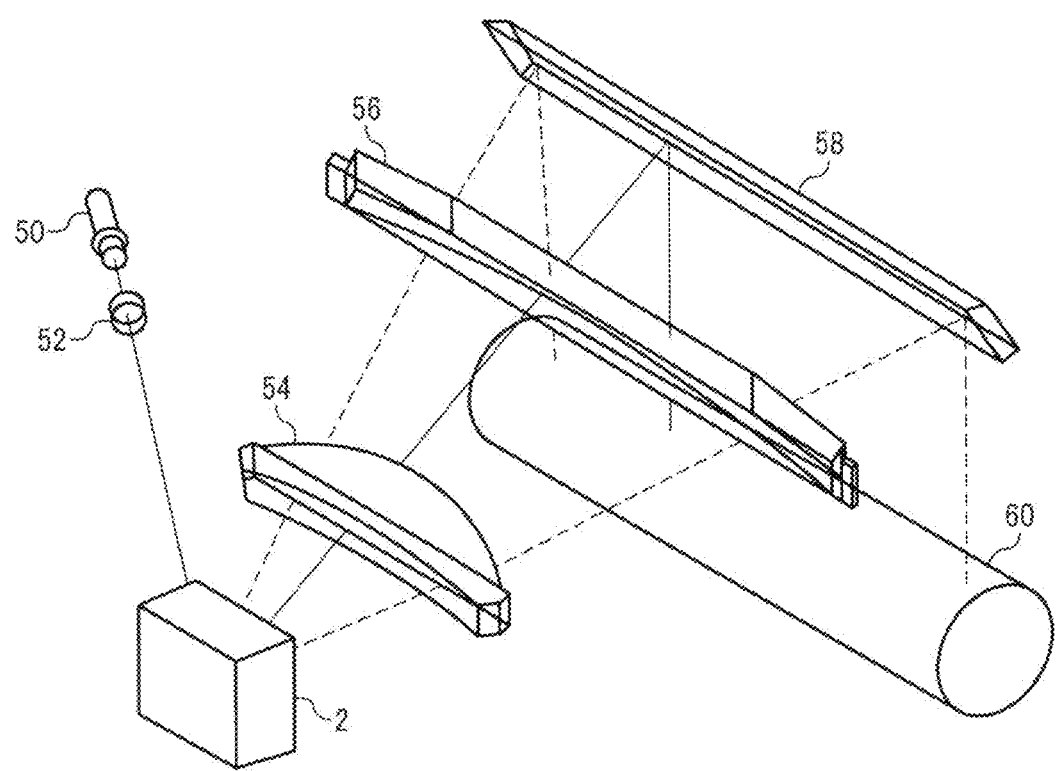
FIG. 16 is a perspective view of an optical scanner according to a second embodiment of the present invention.
Figure 17:
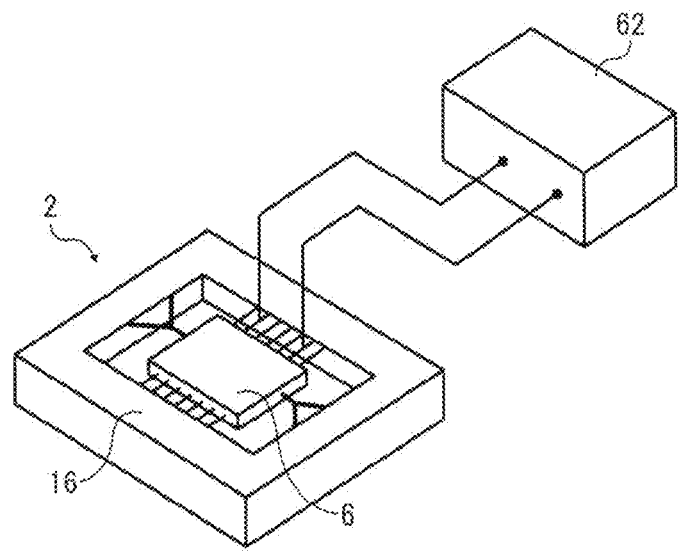
FIG. 17 is a perspective view of the driving mechanism of a deflection mirror according to a second embodiment of the present invention.

FIG. 16 and FIG. 17 are diagrams of an optical scanner according to a second embodiment of the present invention. As illustrated in FIG. 16, the laser beam emitted from the laser element 50 that serves as a light source passes through a collimate optical system 52, and is deflected by a deflection mirror 2. The deflected laser beam is formed in a state of spot on a to-be-scanned surface 60 such as a photoconductor drum after passing through an imaging optical system that includes an fθ lens 54, a toroidal lens 56, and a mirror 58. The deflection mirror 2 is similar to the light deflector of the embodiments described above.

As illustrated in FIG. 17, a mirror driver 62 that drives the deflection mirror 2 is provided for an optical scanner. The lower electrode and the upper electrode as illustrated in FIG. 4A, FIG. 4B, and FIG. 4C are electrically connected to the mirror driver 62. The mirror driver 62 applies a driving voltage between the lower electrode and the upper electrode. The optical scanner according to the present embodiment may be used as an optical scanner of a photo-printing printer or an image forming apparatus such as a copier.

Figure 18:
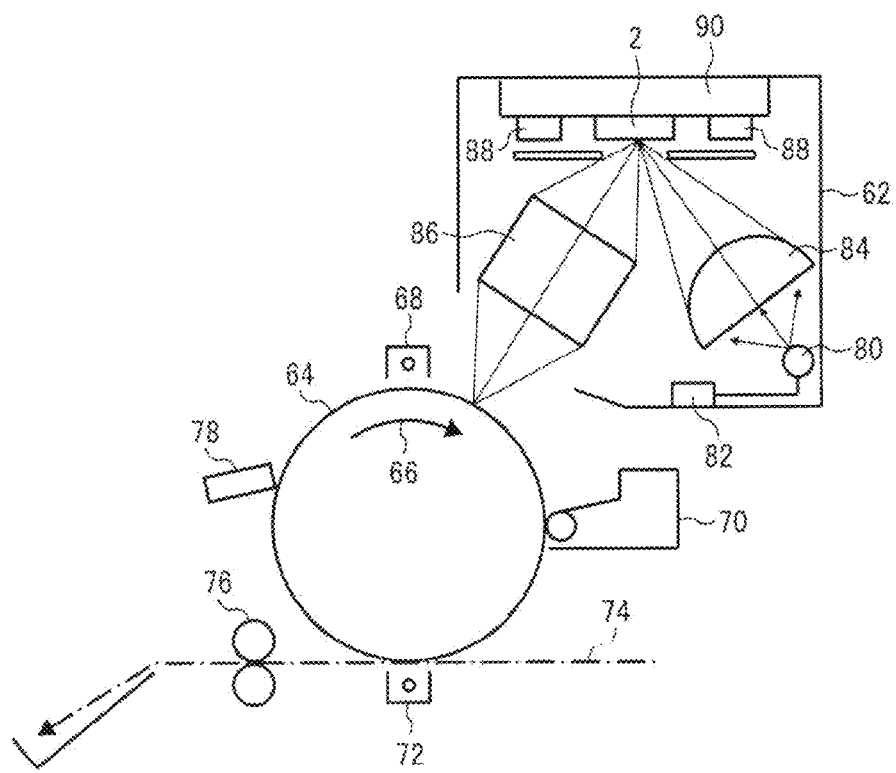
FIG. 18 illustrates principal parts of an image forming apparatus according to a third embodiment of the present invention.

FIG. 18 illustrates principal parts of an image forming apparatus according to a third embodiment of the present invention. An optical writing unit (optical scanner) 62 provided with the light deflector 2 described in the embodiments above emits the laser beam to a to-be-scanned surface to write an image thereon. A photoconductor drum 64 serves as an image bearer, and is provided with a surface to be scanned by the optical writing unit 62. The optical writing unit 62 scans the surface (to-be-scanned surface) of the photoconductor drum 64 using a single or a plurality of laser beams modulated by a recording signal, in the axial direction of the photoconductor drum 64.

The photoconductor drum 64 is driven to rotate in the direction indicated by an arrow 66, and the surface that is charged by a charging device 68 is optically scanned by the optical scanner 62. Accordingly, an electrostatic latent image is formed. The electrostatic latent image is visualized by a developing device 70 as a toner image, and the toner image is transferred by a transfer unit 72 to a recording paper 74 that serves as transfer medium. The transferred toner image is fixed by a fixing unit 76 to the recording paper 74. The residual toner on the surface of the photoconductor drum 64 that has passed through the transfer unit 72 of the photoconductor drum 64 is removed by a cleaning unit 78.

A belt type photoconductor may be used in place of the photoconductor drum 64. An intermediate transfer system may be adopted in which a toner image is temporarily transferred to a transfer medium other than a recording paper and the toner image is transferred from the transfer medium to a recording paper and is fixed. The optical writing unit 62 includes, for example, a light source 80 that emits a single or a plurality of laser beams modulated by a recording signal, a light source driver 82 that modulates the light source, the light deflector 2 of the embodiments described above, an imaging optical system 84 that forms an image of the laser beam (light beam) modulated by a recording signal, which is emitted from the light source 80, on the light reflection plane of the light deflector 2, and a scanning optical system 86 that forms an image of a single or a plurality of laser beams reflected at the mirror surface on the surface (to-be-scanned surface) of the photoconductor drum 64. The light deflector 2 is mounted on a substrate 90 together with an integrated circuit 88 that drives the light deflector 2, and is integrated into the optical writing unit 62.

The light deflector 2 requires a low power consumption to operate compared with a polygon mirror, and thus is advantageous in power-saving of an image forming apparatus. The light deflector 2 makes a smaller wind noise when the mirror unit oscillates compared with a polygon mirror, and thus is advantageous in achieving low noise of an image forming apparatus. The optical scanner 62 requires much smaller footprint than that of a polygon mirror, and the amount of the heat generated by the light deflector 2 is a little. Accordingly, downsizing is easily achieved, and thus the optical scanner 62 is advantageous in downsizing the image forming apparatus. Note that the conveyance system of the recording paper 74, the driving mechanism of the photoconductor drum 64, the controller of the developing device 70 and the transfer unit 72, and the drive system of the light source 80 are similar to those of the conventional image forming apparatus, and thus are omitted in FIG. 18.

Figure 19:
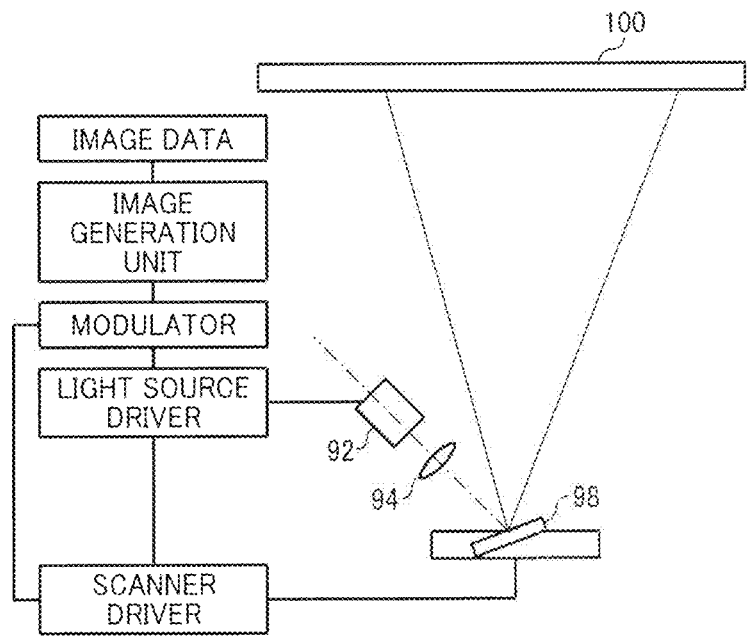
FIG. 19 is a diagram of an image projector according to a fourth embodiment of the present invention.
Figure 20:
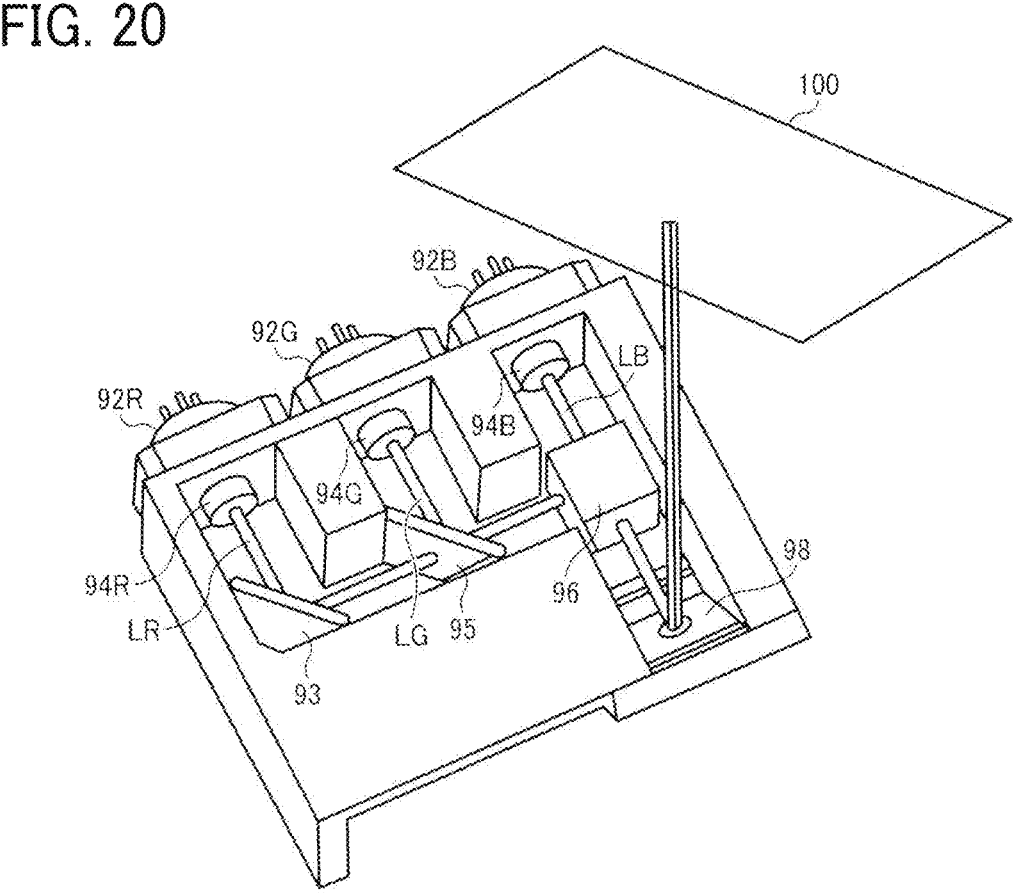
FIG. 20 is a perspective view and schematic block diagram of an image projector according to the fourth embodiment of the present invention.

FIG. 19 and FIG. 20 are diagrams of an image projector according to a fourth embodiment of the present invention. FIG. 19 is a diagram of an image projector according to the present embodiment. As illustrated in FIG. 19, the image projector includes an image generation unit, a modulator, a light source driver, and a scanner driver. The image generation unit generates a drive instruction based on the image data to control the light source driver and the scanner driver. The modulator converts the drive instruction from the image generation unit into a modulated optimal driving signal. The light source driver controls the light source based on the modulated signal. The scanner driver controls a two-dimensional reflection angle variable mirror 98 based on the modulated signal. FIG. 20 is a perspective view of the entire image projector according to the present embodiment. The image projector according to the present embodiment includes laser beam sources 92R, 92G, and 92B that emit laser beams of three different wavelengths, and collimator lenses 94R, 94G, and 94B that are arranged near the exit ends of the respective laser beam sources to approximately collimate the diverging light emitted from the laser beam sources 92R, 92G, and 92B. The laser beam sources 92R, 92G, and 92B emit red laser beam LR, green laser beam LG, and blue laser beam LB, respectively. The laser beam LR is reflected by a mirror 93, and passes through a half mirror 95 or is reflected by the half mirror 95.

The approximately-collimated laser beam is combined by a combining prism 96, and enters a two-dimensional reflection angle variable mirror 98 of MEMS. The configuration of the two-dimensional reflection angle variable mirror 98 is similar to that of the light deflector of the embodiments described above. The two-dimensional reflection angle variable mirror 98 resonates and oscillates in two directions that are orthogonal to each other, with an amplitude of prescribed angle (for example, 10 degrees). The two-dimensional reflection angle variable mirror 98 may be configured by a combination of two one-dimensional scanning mirrors, instead of a single unit of two-dimensional reflection angle variable mirror. Alternatively, a rotation scanning mirror such as a polygon mirror may be used.

The intensity of the laser beam sources of three different wavelengths are modulated in accordance with the timing at which each laser beam is deflected and scanned by the two-dimensional reflection angle variable mirror 98, and two-dimensional image data is projected on a projection plane 100. In intensity modulation, pulse width or amplitude may be modulated. A driver converts a modulated signal into electric current capable of driving the laser, and the laser beam source is driven by the obtained electric current.

Figure 21:
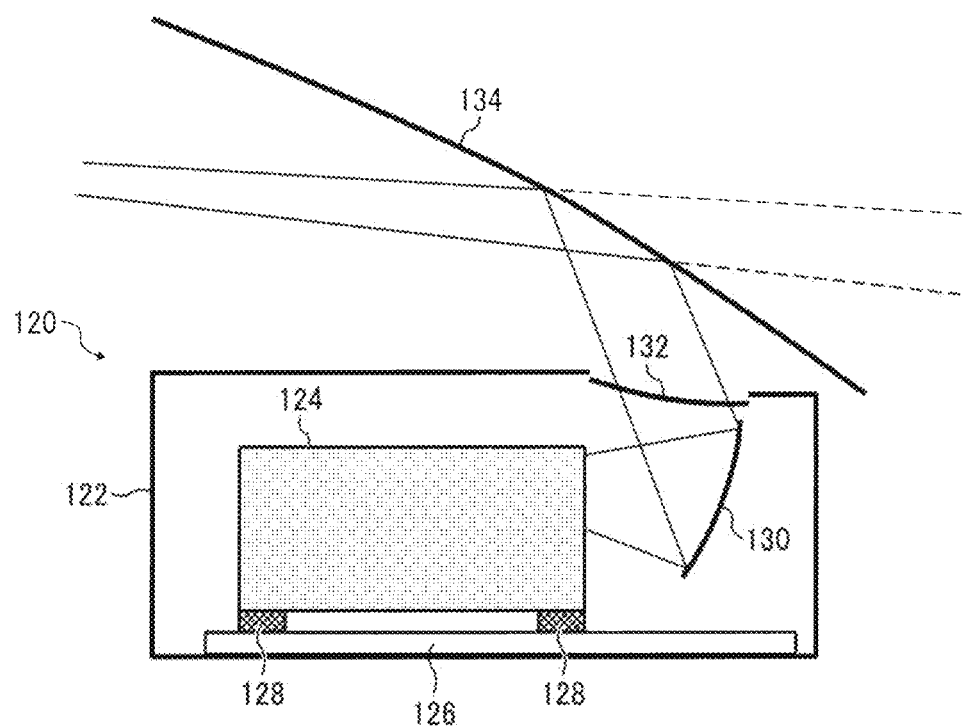
FIG. 21 is a schematic diagram of a heads-up display (HUD) according to a fifth embodiment of the present invention.
Figure 22:
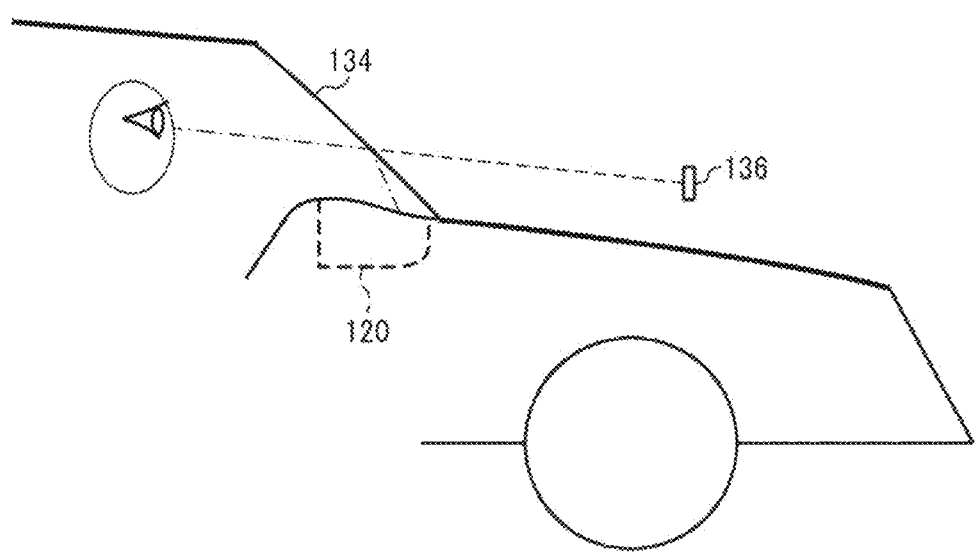
FIG. 22 is a diagram illustrating the relation between the position of a HUD inside a vehicle and the position at which an image projected by the HUD is visually recognized, according to an embodiment of the present invention.
Figure 23:
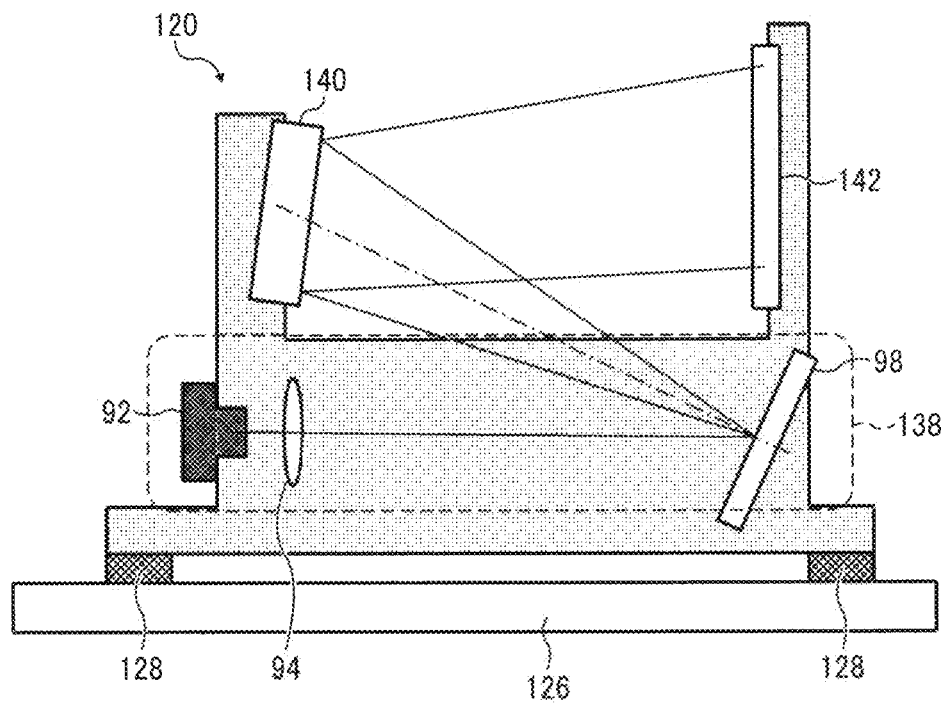
FIG. 23 is a diagram of the image forming unit of a HUD according to an embodiment of the present invention.

FIG. 21, FIG. 22, and FIG. 23 are schematic diagrams of a heads-up display (HUD) according to a fifth embodiment of the present invention. The HUD according to the present embodiment includes the image projector with a deflection mirror of the embodiments described above. FIG. 21 is a schematic diagram of the entire HUD according to the fifth embodiment of the present invention. The HUD according to the present embodiment is a HUD of windshield type where the front windshield of a vehicle is used as a part of the projection plane. As illustrated in FIG. 21, the HUD 120 includes, for example, a housing 122, and an image forming unit 124 that is accommodated in the housing 122. The image forming unit 124 is disposed on the base 126 that is arranged at the bottom of the housing 122, via a vibration isolator 128.

An image that is formed by the image forming unit 124 is emitted through a screen as will be described later. Then, the image is reflected by a projector mirror 130 that serves as an image projection unit, and is emitted to a windshield 134 through an exit window 132. As illustrated in FIG. 22, the light reflected as above reaches the eyes of a driver. From a view point of the driver, an image emitted to the screen is recognized as a virtual image 136 several meters ahead of the windshield (visually recognized field).

As illustrated in FIG. 23, the image forming unit 124 includes the image projector of the fourth embodiment described above. In FIG. 23, only one laser beam source 92 is illustrated, but color display may be performed using laser beams of three colors in a similar manner to the embodiment described above. The laser beam that is emitted from the laser beam source 92 is approximately collimated by the coupling lens 94, and the two-dimensional reflection angle variable mirror 98 is irradiated with the approximately-collimated laser beam. The laser beam that has entered the two-dimensional reflection angle variable mirror 98 is scanned in the biaxial directions of the main scanning direction and the sub-scanning direction, and is emitted to a screen 142 through a scanning mirror 140. The laser beam source may be modulated by a laser beam modulating unit to form an image as desired. The screen 142 is formed, for example, by a diffusing board and a microlens, and an intermediate image formed on the screen 142 is visually recognized by a driver as a virtual image through a mirror 130 and a front windshield 134 of the projection system.

Figure 24:
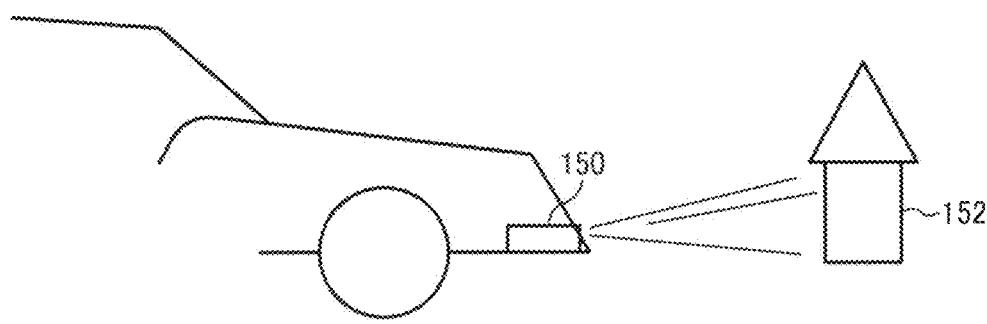
FIG. 24 illustrates a laser radar in use according to a sixth embodiment of the present invention.
Figure 25:
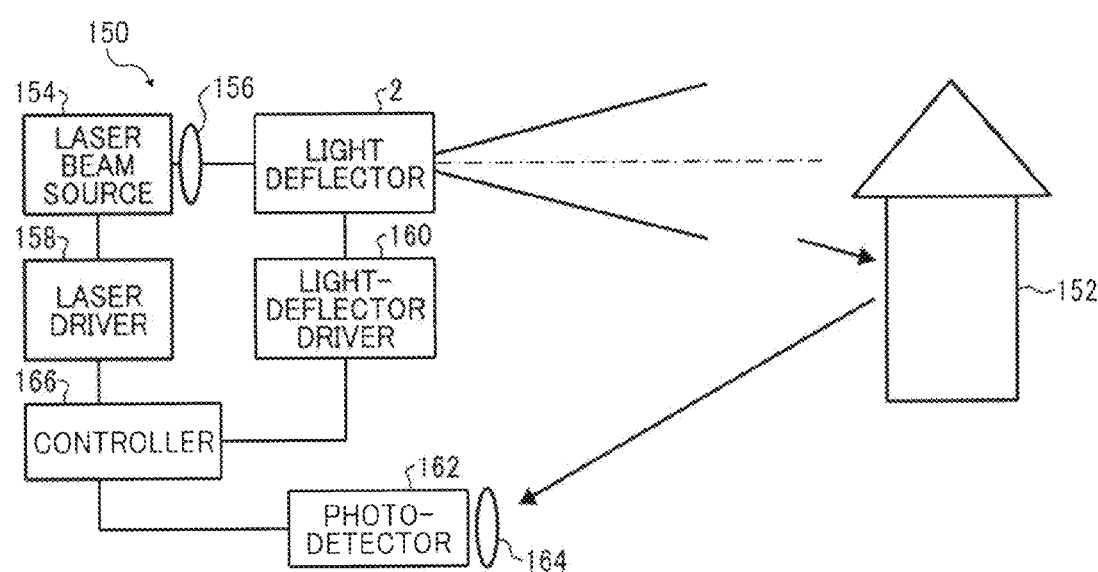
FIG. 25 is a block diagram illustrating the configuration of a laser radar according to an embodiment of the present invention.

FIG. 24 and FIG. 25 are diagrams of a laser radar 150 according to a sixth embodiment of the present invention. The laser radar 150 according to the present embodiment monitors ahead of the vehicle. As illustrated in FIG. 24, the laser radar 150 is disposed at the front of the vehicle. The laser beam that is emitted from the laser radar 150 strikes an object 152 and is reflected.

As illustrated in FIG. 25, the laser radar 150 includes a laser beam source 154, a collimator lens 156 that serves as a collimate optical system for approximately collimating the light diverging from the laser beam source 154, and a laser driver 158 that drives the laser beam source 154. Moreover, the laser radar 150 includes the light deflector 2 described above that deflects and scans the laser beam that has passed through the collimator lens 156, a light-deflector driver 160 that drives the light deflector 2, and a photodetector 162 that receives the laser beam deflected by the light deflector 2 and reflected at an object 152. Further, the laser radar 150 includes a condenser lens 164 that concentrates the reflected laser beam onto the photodetector 162, and a controller 166 that controls the laser driver 158 and the light-deflector driver 160 and processes and computes the detection signal output from the photodetector 162.

The laser beam that is emitted from the laser beam source 154 is uniaxially or biaxially scanned by the light deflector 2, and irradiates the object 152 placed ahead of the vehicle. The laser beam that is reflected by the object 152 is detected by the photodetector 162, and the controller 166 calculates the distance from the object 152 based on the time lag between a timing at which the laser beam is emitted and a timing at which the laser beam is received by the photodetector 162. By scanning the laser beam with the light deflector 2, the distance from the object 152 in a one-dimensional or two-dimensional area can be obtained.

The embodiments described above may be applied to bar code scanners.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

What is claimed is:

1. A light deflector comprising:
   a mirror unit having a light reflection plane;
   a base;
   a pair of elastic supporting members each having one end attached to the mirror unit and the other end attached to the base and configured to support the mirror unit in a rotatable and oscillatable manner; and
   a pair of drive bars each having one end attached to another end of a corresponding one of the elastic supporting members and the other end attached to the base in a cantilevered state, the pair of drive bars being deformable in response to an external force,
   wherein
   the mirror unit rotates and oscillates about a center of rotation as deformation of the drive bars is transmitted to the mirror unit through the elastic supporting members, and
   the center of rotation of the mirror unit is within a range of $-0.05 \times D$ to $-0.01 \times D$, where D denotes a diameter of the mirror unit and the minus denotes a direction opposite to a direction from fixed ends to free ends of the drive bars with reference to a center of the mirror unit.

2. The light deflector according to claim 1, wherein the center of rotation of the mirror unit when the mirror unit rotates and oscillates is approximately $-0.03 \times D$.

3. The light deflector according to claim 2, wherein one end of each of the pair of elastic supporting members and an attached portion of the mirror unit are arranged such that the center of rotation of the mirror unit when the mirror unit rotates and oscillates is displaced from the center of the mirror unit.

4. The light deflector according to claim 2, wherein the pair of drive bars have a length in a longer-side direction sufficient to displace the center of rotation of the mirror unit when the mirror unit rotates and oscillates from the center of the mirror unit.

5. The light deflector according to claim 2, wherein the pair of drive bars deform in response to application of voltage.

6. An optical scanner comprising:
   a light source configured to emit light;
   a light deflector according to claim 2, configured to deflect a light beam emitted from the light source; and
   an imaging optical system configured to form an image of deflected light beam in a state of spot on a to-be-scanned surface.

7. An image forming apparatus comprising:
   an image bearer;
   an optical scanner according to claim 6, configured to form an electrostatic latent image on the image bearer according to image data;
   a developing device configured to visualize the electrostatic latent image to form a visible image; and
   a transfer unit configured to transfer the visible image to a transfer medium.

8. An image projector comprising:
   a light source configured to emit light;
   a collimate optical system configured to collimate light diverging from the light source; and
   a light deflector according to claim 2, configured to deflect and scan the light collimated by the collimate optical system to display an image on a projection plane.

9. A heads-up display comprising:
   an image projector according to claim 8, configured to project an image;
   a screen configured to project the image projected from the image projector; and
   an image projection unit configured to project the image projected on the screen to a prescribed visually recognized field.

10. A laser radar comprising:
    a laser beam source configured to emit laser beam;
    a collimate optical system configured to collimate the laser beam diverging from the laser beam source;
    a laser driver configured to drive the laser beam source;
    a light deflector according to claim 2, configured to deflect and scan the laser beam collimated by the collimate optical system;
    a light-deflector driver configured to drive the light deflector;
    a photodetector configured to receive reflection light of the laser beam deflected by the light deflector; and
    a controller configured to control the laser driver and the light-deflector driver to process and compute a detection signal output from the photodetector.

11. The light deflector according to claim 1, wherein one end of each of the pair of elastic supporting members and an attached portion of the mirror unit are arranged such that the center of rotation of the mirror unit when the mirror unit rotates and oscillates is displaced from the center of the mirror unit.

12. The light deflector according to claim 1, wherein the pair of drive bars have a length in a longer-side direction sufficient to displace the center of rotation of the mirror unit when the mirror unit rotates and oscillates from the center of the mirror unit.

13. The light deflector according to claim 1, wherein the pair of drive bars deform in response to application of voltage.

14. An optical scanner comprising:
    a light source configured to emit light;
    a light deflector according to claim 1, configured to deflect a light beam emitted from the light source; and
    an imaging optical system configured to form an image of deflected light beam in a state of spot on a to-be-scanned surface.

15. An image forming apparatus comprising:
    an image bearer;
    an optical scanner according to claim 14, configured to form an electrostatic latent image on the image bearer according to image data;
    a developing device configured to visualize the electrostatic latent image to form a visible image; and
    a transfer unit configured to transfer the visible image to a transfer medium.

16. An image projector comprising:
    a light source configured to emit light;
    a collimate optical system configured to collimate light diverging from the light source; and
    a light deflector according to claim 1, configured to deflect and scan the light collimated by the collimate optical system to display an image on a projection plane.

17. A heads-up display comprising:
    an image projector according to claim 16, configured to project an image;

a screen configured to project the image projected from the image projector; and an image projection unit configured to project the image projected on the screen to a prescribed visually recognized field.

18. A laser radar comprising:

a laser beam source configured to emit laser beam;

a collimate optical system configured to collimate the laser beam diverging from the laser beam source;

a laser driver configured to drive the laser beam source;

a light deflector according to claim 1, configured to deflect and scan the laser beam collimated by the collimate optical system;

a light-deflector driver configured to drive the light deflector;

a photodetector configured to receive reflection light of the laser beam deflected by the light deflector; and a controller configured to control the laser driver and the light-deflector driver to process and compute a detection signal output from the photodetector.

19. A light deflector comprising:

a mirror unit having a light reflection plane;

a base;

a pair of elastic supporting members each having one end attached to the mirror unit and the other end attached to the base and configured to support the mirror unit in a rotatable and oscillatable manner; and a pair of drive bars each having one end attached to another end of a corresponding one of the elastic supporting members and the other end attached to the base in a cantilevered state, the pair of drive bars being deformable in response to an external force, wherein the mirror unit rotates and oscillates about a center of rotation as deformation of the drive bars is transmitted to the mirror unit through the elastic supporting members, and the center of rotation of the mirror unit at an operating frequency is within a range of −58 μm to −10 μm, where the minus denotes a direction opposite to a direction from fixed ends to free ends of the drive bars with reference to a center of the mirror unit.

20. The light deflector according to claim 19, wherein the center of rotation of the mirror unit at the operating frequency when the mirror unit rotates and oscillates is approximately −34 μm.

* * * * *